United States Patent
Reali et al.

(10) Patent No.: US 12,071,273 B2
(45) Date of Patent: *Aug. 27, 2024

(54) PALLET MODULE, ASSORTMENT OF PALLET MODULES, AND PALLET ASSEMBLY BUILT OF THE SAME

(71) Applicant: Ponera Group Sagl, Figino (CH)

(72) Inventors: Matthew Reali, Figino (CH); Masoud Talebi Amiri, Chavannes-près-Renens (CH)

(73) Assignee: Ponera Group Sagl, Figino (CH)

( * ) Notice: Subject to any disclaimer, the term of this patent is extended or adjusted under 35 U.S.C. 154(b) by 437 days.

This patent is subject to a terminal disclaimer.

(21) Appl. No.: 17/420,255

(22) PCT Filed: Jan. 6, 2020

(86) PCT No.: PCT/IB2020/050057
§ 371 (c)(1),
(2) Date: Jul. 1, 2021

(87) PCT Pub. No.: WO2020/141492
PCT Pub. Date: Jul. 9, 2020

(65) Prior Publication Data
US 2022/0063865 A1     Mar. 3, 2022

(30) Foreign Application Priority Data

Jan. 5, 2019  (EP) .................................... 19150439
Jan. 5, 2019  (EP) .................................... 19150440

(51) Int. Cl.
B65D 19/00       (2006.01)

(52) U.S. Cl.
CPC .................. B65D 19/0051 (2013.01); *B65D 2519/00034* (2013.01); *B65D 2519/00069* (2013.01);
(Continued)

(58) Field of Classification Search
USPC ...................... 108/54.1, 64, 56.1, 56.3, 51.11
See application file for complete search history.

(56) References Cited

U.S. PATENT DOCUMENTS

| | | | | |
|---|---|---|---|---|
| 2,596,663 | A | * | 5/1952 | Duffy ................... A47B 87/002 108/69 |
| 3,342,147 | A | * | 9/1967 | Shettles ............... A47B 87/002 108/186 |

(Continued)

FOREIGN PATENT DOCUMENTS

| | | |
|---|---|---|
| CH | 703404 A2 | 1/2012 |
| CN | 205023079 U | 2/2016 |

(Continued)

OTHER PUBLICATIONS

Benoit Montreuil; Towards a Physical Internet: Meeting the Global Logistics Sustainability Grand Challenge; CIRRELT; Jan. 2011; 29 pages.

(Continued)

*Primary Examiner* — Jose V Chen
(74) *Attorney, Agent, or Firm* — Taft Stettinius & Hollister LLP

(57) ABSTRACT

A pallet module configured to allow formation of a nested pallet assembly of at least two similar pallet modules, including a main structural body having a generally quadrilateral peripheral border with first to fourth lateral sides, first and second lateral flanges extending outwardly from the peripheral border along the first and second lateral sides and configured to cooperate with first and second lateral grooves extending inwardly from the peripheral border along the third and fourth lateral sides of another similar pallet module to form the nested pallet assembly, a foot structure disposed on a lower side of the main structural body, and first and second toggle latch components arranged in the vicinity of the first and second lateral sides, respectively, configured to (Continued)

cooperate and releasably interlock with third and fourth toggle latch components arranged in the vicinity of the third and fourth lateral sides, respectively, of another similar pallet module.

31 Claims, 31 Drawing Sheets

(52) U.S. Cl.
CPC .............. *B65D 2519/00129* (2013.01); *B65D 2519/00273* (2013.01); *B65D 2519/00288* (2013.01); *B65D 2519/00293* (2013.01); *B65D 2519/00308* (2013.01); *B65D 2519/00323* (2013.01); *B65D 2519/00338* (2013.01); *B65D 2519/00407* (2013.01); *B65D 2519/00412* (2013.01); *B65D 2519/00437* (2013.01); *B65D 2519/00572* (2013.01); *B65D 2519/00746* (2013.01); *B65D 2519/0094* (2013.01)

(56) References Cited

U.S. PATENT DOCUMENTS

| | | | |
|---|---|---|---|
| 3,650,224 A * | 3/1972 | Petix ................. | B65D 21/0204 108/56.1 |
| 3,857,342 A | 12/1974 | Johns | |
| 4,095,769 A * | 6/1978 | Fengels ............. | B65D 19/0002 248/346.02 |
| 4,150,630 A * | 4/1979 | Pokorny ............. | A47B 91/16 108/90 |
| 4,591,289 A * | 5/1986 | Vickers .............. | A47C 13/005 292/249 |
| 4,694,962 A * | 9/1987 | Taub .................. | B65D 19/0073 206/386 |
| 4,895,080 A * | 1/1990 | Thomas .............. | B65D 19/38 52/591.1 |
| 5,105,746 A | 4/1992 | Reynolds | |
| 5,267,516 A * | 12/1993 | Abrahamson ...... | B65D 71/0096 206/597 |
| 5,413,052 A * | 5/1995 | Breezer ............. | B65D 19/0012 108/57.33 |
| 5,678,948 A * | 10/1997 | White ................. | A47B 95/00 403/321 |
| 5,791,262 A * | 8/1998 | Knight ............... | B65D 19/0012 108/57.25 |
| 5,860,369 A * | 1/1999 | John .................. | B65D 19/0075 108/56.1 |
| 6,032,590 A * | 3/2000 | Chen .................. | A47B 3/12 403/381 |
| 6,041,721 A * | 3/2000 | Weston ............... | E05C 19/14 108/65 |
| 6,199,487 B1 | 3/2001 | Coddington | |
| 6,234,087 B1 * | 5/2001 | Brown ................ | B65D 19/004 108/56.1 |
| 6,263,807 B1 * | 7/2001 | Fox .................... | B65D 19/0073 108/57.25 |
| D613,924 S * | 4/2010 | Dong .................. | D34/38 |
| 7,752,980 B2 * | 7/2010 | Muirhead ........... | B29C 66/96 340/505 |
| 7,802,527 B2 * | 9/2010 | Dong .................. | B65D 71/063 108/56.1 |
| 8,176,857 B2 * | 5/2012 | Ochs .................. | A47B 87/002 108/23 |
| 8,701,570 B2 * | 4/2014 | Wilson ............... | B65D 19/0016 108/56.1 |
| 2005/0051061 A1 | 3/2005 | Smith | |
| 2005/0247241 A1 * | 11/2005 | Sherman ............ | A47B 13/088 108/64 |
| 2009/0145339 A1 * | 6/2009 | Dubois ............... | B65D 19/0014 108/56.1 |
| 2011/0061572 A1 | 3/2011 | Liu et al. | |
| 2011/0120353 A1 * | 5/2011 | Jensen ................ | B65D 19/0073 108/57.25 |
| 2012/0156438 A1 | 6/2012 | Nam | |
| 2012/0240500 A1 | 9/2012 | Bjorkman | |
| 2015/0096837 A1 | 4/2015 | Aguilar | |
| 2016/0290659 A1 | 10/2016 | Zhong | |
| 2019/0144163 A1 | 5/2019 | Lim | |

FOREIGN PATENT DOCUMENTS

| | | | | |
|---|---|---|---|---|
| CN | 106081306 A | | 11/2016 | |
| CN | 206345153 U | | 7/2017 | |
| CN | 109051191 A | | 12/2018 | |
| DE | 2231178 A1 | | 1/1974 | |
| EP | 3075922 A1 | | 10/2016 | |
| FR | 2157171 A5 | | 6/1973 | |
| FR | 2859458 A1 | | 3/2005 | |
| GB | 2100121 A | * | 12/1982 | ........... A47B 87/002 |
| JP | H0585546 A | | 4/1993 | |
| KR | 101862662 B1 | | 5/2018 | |
| WO | 9831595 A1 | | 7/1998 | |
| WO | 2010064986 A1 | | 6/2010 | |
| WO | 2010128261 A2 | | 11/2010 | |
| WO | 2017023163 A1 | | 2/2017 | |
| WO | 2017200482 A1 | | 11/2017 | |

OTHER PUBLICATIONS

International Search Report; European Patent Office; International Application No. PCT/IB2020/050057; Mar. 11, 2020; 7 pages.
Written Opinion of the International Searching Authority; European Patent Office; International Application No. PCT/IB2020/050057; Mar. 11, 2020; 9 pages.

* cited by examiner

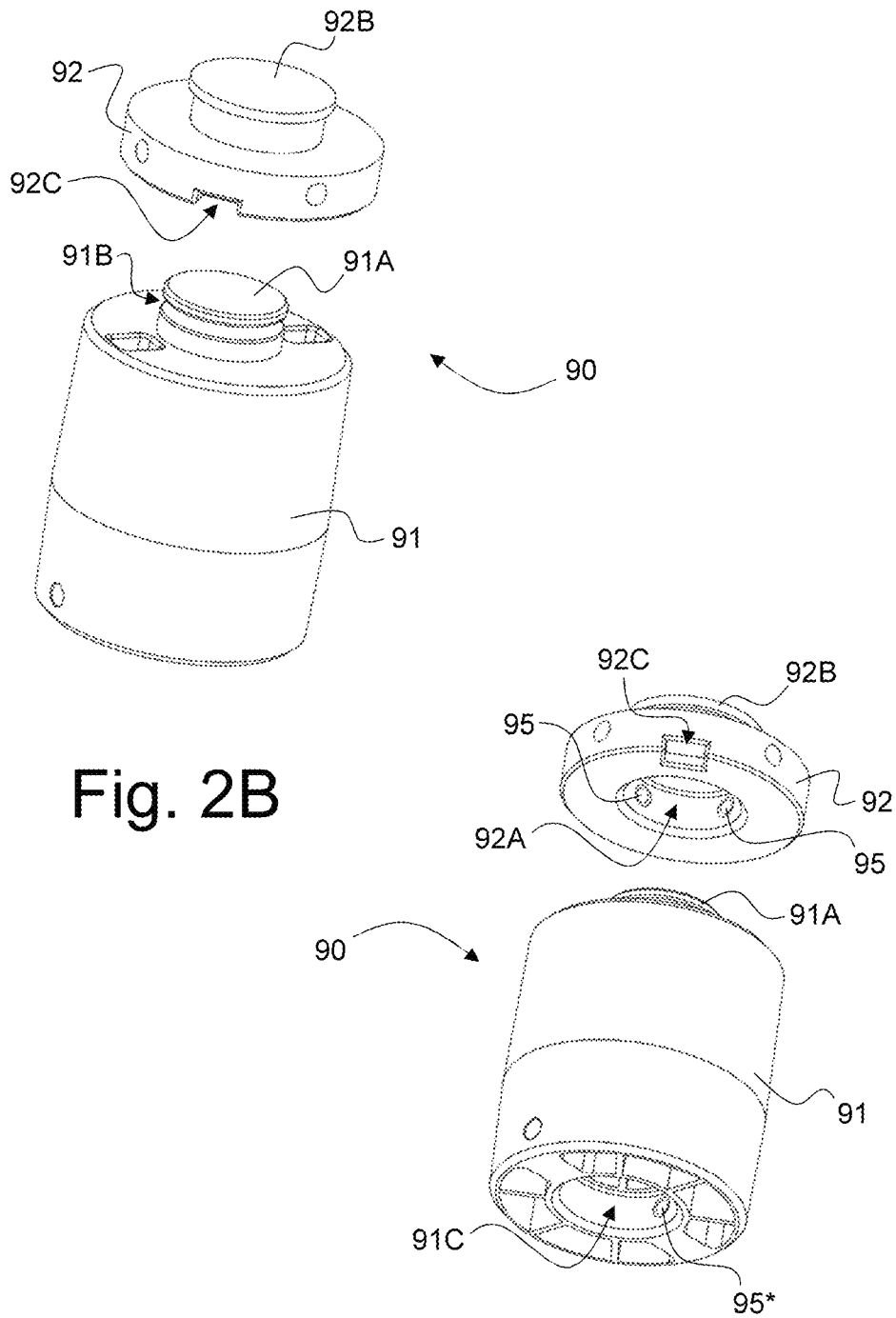

PALLET MODULE, ASSORTMENT OF PALLET MODULES, AND PALLET ASSEMBLY BUILT OF THE SAME

CROSS REFERENCE TO RELATED APPLICATIONS

This application is a U.S. national stage filing of International Patent Application No. PCT/IB2020/050057 filed Jan. 6, 2020, which claims priority to European Application No. 19150439.8 filed Jan. 5, 2019 and also claims priority to European Application No. 19150440.6 filed Jan. 5, 2019, the contents of each application hereby incorporated by reference in their entirety.

TECHNICAL FIELD

The present invention generally relates to a pallet module configured to allow formation of a nested pallet assembly of at least two similar pallet modules, which nested pallet assembly is configured to act as a self-supporting platform allowing the handling and transportation of goods. The invention also relates to an assortment of such pallet modules produced in at least two different sizes, as well as to a pallet assembly built of multiple such pallet modules which are nested within and interlocked with one another.

BACKGROUND OF THE INVENTION

U.S. Pat. No. 3,857,342 A discloses a pallet formed of nestable plastic modules each having four centrally located legs and four outwardly extending flanges, with each of the flanges having means for interlocking with the flanges of adjacent modules. While this solution is suitable for forming a nested pallet assembly of at least two pallet modules, the resulting pallet assembly is however insufficiently robust, the mating and interlocking system being prone to undesired release, leading to potential disconnection of the pallet modules during handling and/or transport of loads, which is clearly undesirable. This is especially critical for the transport of large loads.

The interlocking system contemplated in U.S. Pat. No. 3,857,342 A is furthermore prone to breakage after repeated uses due to the inherent local deformations of the plastic material at the points of attachment between the pallet modules.

Other similar solutions are disclosed in U.S. Pat. No. 5,105,746 A, Japanese Patent Publication No. JP (H) 5-85546 A, Chinese Utility Model Publications Nos. CN 205023079 U and CN 206345153 U, and International (PCT) Publication Nos. WO 98/31595 A1, WO 2017/023163 A1, WO 2017/200482 A1 and WO 2010/128261 A2.

French Patent No. FR 2 157 171 A5 discloses yet another solution where individual pallet modules are securable one to the other in a longitudinal direction by means of first and second toggle latch components located on opposite lateral sides of each pallet module, which first and second toggle latch components are configured to cooperate and interlock with corresponding toggle latch components of another similar pallet module to form releasable toggle latches allowing any given pallet module to be secured to or released from one or two similar pallet modules in the longitudinal direction.

Chinese patent publication No. CN 106081306 A discloses a pallet with a foot structure comprising multiple individual foot elements that are each secured to a lower side of a main structural body of the pallet thanks to a spring-loaded locking mechanism that is integrated into the main structural body of the pallet. The spring-loaded locking mechanism is configured to cooperate with a conical head portion of the foot element and to allow the foot element to be manually inserted into and automatically interlock with the spring-loaded locking mechanism without this requiring any tool. However, once the foot element has been fully inserted into its mounting location, it is irreversibly secured to the lower side of the pallet by the spring-loaded locking mechanism, thus preventing selective manual release of the foot element.

These other known solutions likewise have drawbacks, including complex nesting and/or interlocking systems that unnecessarily complicate assembly and disassembly of multiple pallet modules one with, respectively from the other, which leads to reduced efficiency in usage.

A further problem with the aforementioned known pallet modules resides in that they are not optimized for shipment or warehousing of the individual pallet modules and components, especially due to the presence of feet that are typically made integral with a main structural body of the pallet module. This known solution may furthermore restrict the ability to stack individual pallet modules one on top of the other in a compact manner.

Another problem with the known pallet modules resides in the lack of flexibility thereof, especially in terms of sizes and dimensions which are not optimal and restrict the user's ability to build a large variety of pallet assemblies of varying sizes and dimensions for non-standard size goods or equipment. Furthermore, the height of the known pallet modules, and of the resulting pallet assemblies, is not optimized and the configuration thereof typically restricts the ability to use the full volume of the transport units and/or to efficiently stack individual pallet modules one above the other for e.g. shipment or warehousing purposes. This is especially the case for pallet modules comprising a foot structure that is made integral with the main structural body of the pallet modules.

As a consequence of these limitations, end users are typically led to make use of conventional wooden pallets, such as Euro-pallets, standard US pallets, and/or other non-standard wooden pallets for larger sized goods or equipment. Even though these wooden pallets can be produced in basically any sizes, and can be regarded as providing a reasonably flexible solution, they do not constitute an efficient solution for end users due to the fact that they are produced to meet specific needs and are typically intended for single use, which makes this solution cost inefficient and environmentally non-sustainable. As far as standard-size Euro-pallets are concerned, these are cheap to produce but, overall, their fixed size of 1200 mm×800 mm×144 mm (length×width×height) is not optimal when it comes to shipping and/or warehousing individual pallets and/or for the packaging and shipment of goods or equipment requiring a specific, non-standard pallet solution. The same is true for similarly semi-standardized pallets. As a matter of fact, such standardized or semi-standardized pallet solutions only allow to exploit at most of the order of 80% to 90% of the available shipping space of a standard dry container (be it 20 feet or 40 feet in length), which leads to huge inefficiencies and substantial waste in shipping space. The existing solutions do not therefore provide flexibility and adaptability in terms of pallet sizes, which is important for transport, packaging and cost efficiency. Conventional wooden pallets are furthermore not very robust and are prone to breakage, meaning that their usability and life cycle is typically limited to single use or at best to only a few usage cycles (typically less than five times on average). Standard-sized pallets like the Euro-pallets do not furthermore constitute an optimal solution for shipment of goods or equipment having non-standard sizes and dimensions.

SUMMARY OF THE INVENTION

A general aim of the invention is to provide an improved pallet module of the type configured to allow formation of a nested pallet assembly of at least two similar pallet modules.

More specifically, an aim of the present invention is to provide such a pallet module that ensures formation of a robust pallet assembly, while not compromising ease and speed of assembly and disassembly.

Yet another aim of the invention is to provide such a pallet module that is constructed and designed to facilitate and optimize shipment as well as warehousing of individual pallet modules and components thereof thanks to more optimal sizes and configurations.

A further aim of the invention is to provide such a pallet module comprising an improved foot structure.

Still another aim of the invention is to provide an assortment of pallet modules from which the end user can choose to build a large variety of pallet assemblies.

Another aim of the invention is to reduce material consumption and increase shipment flexibility and efficiency, especially by reducing waste and providing a reusable solution.

A further aim of the invention is to provide a solution that allows optimisation of a number of factors which impact flexibility and efficiency, namely (i) pallet assembly time, (ii) cost of pallet material, and (iii) shipment efficiency.

These aims are achieved thanks to the solutions defined in the claims.

In accordance with a first aspect of the invention, there is provided a pallet module according to claim 1, namely a pallet module configured to allow formation of a nested pallet assembly of at least two similar pallet modules, which nested pallet assembly is configured to act as a self-supporting platform allowing the handling and transportation of goods, the pallet module comprising:
 a main structural body exhibiting a generally quadrilateral peripheral border with first to fourth lateral sides extending between upper and lower sides of the main structural body;
 first and second lateral flanges extending outwardly from the peripheral border of the main structural body, along the first and second lateral sides, the first and second lateral flanges being configured to cooperate with a corresponding side portion of another similar pallet module to form the nested pallet assembly; and
 a foot structure disposed on the lower side of the main structural body.

In accordance with this first aspect of the invention, the main structural body exhibits first and second lateral grooves extending inwardly from the peripheral border of the main structural body, along the third and fourth lateral sides, the first and second lateral grooves being each configured to receive the first and second lateral flanges, respectively, of another similar pallet module, so that the first, respectively second lateral flange of said other similar pallet module nests within the first, respectively second lateral groove to form the nested pallet assembly. In addition, the pallet module further comprises first and second toggle latch components arranged in the vicinity of the first and second lateral sides, respectively, and third and fourth toggle latch components arranged in the vicinity of the third and fourth lateral sides, respectively. The first and second toggle latch components are each configured to cooperate and interlock with the third and fourth toggle latch components, respectively, of another similar pallet module of the nested pallet assembly, to form releasable toggle latches allowing the pallet module to be secured to or released from said other similar pallet module.

According to a preferred embodiment of the invention, each of the first and second lateral flanges exhibits at least one positioning notch formed along an outer edge of the first and second lateral flanges, and each of the first and second lateral grooves exhibits at least one protrusion configured to mate with the at least one positioning notch provided on the first and second lateral flanges of another similar pallet module. By way of preference, a position of each positioning notch along the outer edge of the first and second lateral flanges and a position of each protrusion within the first and second lateral grooves coincide with a position of each of the first to fourth toggle latch components along the first to fourth lateral sides.

The first and second lateral flanges may in particular be offset sideways with respect to the first and second lateral sides, with the first and second lateral flanges being optionally joined together to form an L-shaped lateral flange.

By way of preference, the first to fourth toggle latch components are provided on the upper side of the main structural body at least partly within recesses formed below an upper surface of the upper side of the main structural body.

Advantageously, the first and second toggle latch components are spring-loaded latch elements comprising a moveable latch section that extends outwardly beyond the peripheral border of the main structural body, and the third and fourth toggle latch components are catch elements comprising a catch section configured to cooperate with the moveable latch section of the spring-loaded latch elements of another similar pallet module. In this context, the first and second toggle latch components may in particular be manually-actuatable spring-loaded latch elements further comprising a handle section that is mechanically linked to the moveable latch section to allow manual actuation of the first and second toggle latch components.

The first and second lateral flanges may be formed integrally with the main structural body, in which case the main structural body and the first and second lateral flanges can advantageously be made of plastic or biopolymer material. High-density polyethylene (HDPE) may in particular come into consideration. Use of a biopolymer material could also be contemplated as an alternative to plastic material.

In the aforementioned context, the pallet module may furthermore comprise a plurality of reinforcing elements extending within the main structural body and the first and/or second lateral flanges. Such reinforcing element may in particular be made of a metal, such as aluminium, of a metal alloy, or of a composite material.

The aforementioned reinforcing elements are preferably longitudinal rod elements extending between upper and lower surfaces of the main structural body and of the first and/or second lateral flanges. Advantageously, a first series of longitudinal rod elements may extend in a first direction and second series of longitudinal rod elements may extend in a second direction distinct from the first direction.

In accordance with a preferred embodiment of the invention, the pallet module further comprises at least one cover element configured to cover an upper side of the first lateral flange and/or second lateral flange, each cover element having an upper surface that is flush with an upper surface of the upper side of the main structural body. Said at least one cover element comprises at least one toggle latch component configured to cooperate and interlock with a corresponding one of the first and second latch components to form a releasable toggle latch allowing the cover element to be secured to or released from the pallet module.

In accordance with an embodiment of the invention, the foot structure of the pallet module is configured as a releasable foot structure comprising one or more releasable foot elements that can each be secured to or removed from a corresponding foot-receiving element provided on the lower side of the main structural body. Each releasable foot element may in particular be connected to the foot-receiving element by means of a spring-loaded locking mechanism configured to allow the releasable foot element to be manually inserted into and automatically interlock with the foot-receiving element without this requiring any tool, which spring-loaded locking mechanism is further configured to allow selective manual release of the releasable foot element from the foot-receiving element. This latter feature constitutes another independent aspect of the invention as specified below. This being said, in accordance with another embodiment of the invention, the foot structure could also be designed as a fixed foot structure comprising one or more fixed foot elements made integral with or permanently attached to the main structural body of the pallet module.

In accordance with a second aspect of the invention, which second aspect is advantageously combinable with the first aspect of the invention as mentioned above, there is provided a pallet module according to independent claim 22, namely a pallet module configured to allow formation of a nested pallet assembly of at least two similar pallet modules, the pallet module comprising:
- a main structural body exhibiting a generally quadrilateral peripheral border with first to fourth lateral sides extending between upper and lower sides of the main structural body;
- a mating system provided on the first to fourth lateral sides of the main structural body configured to allow nesting of the pallet module within a corresponding part of the mating system of another similar pallet module to form the nested pallet assembly;
- a securing system configured to allow the pallet module to be secured to or released from another similar pallet module of the nested pallet assembly; and
- a foot structure disposed on the lower side of the main structural body.

In accordance with this second aspect of the invention, the foot structure is configured as a releasable foot structure comprising one or more releasable foot elements that can each be secured to or removed from a corresponding foot-receiving element provided on the lower side of the main structural body, and each releasable foot element is connected to the foot-receiving element by means of a spring-loaded locking mechanism configured to allow the releasable foot element to be manually inserted into and automatically interlock with the foot-receiving element without this requiring any tool, the spring-loaded locking mechanism being further configured to allow selective manual release of the releasable foot element from the foot-receiving element.

The aforementioned spring-loaded locking mechanism preferably includes a mounting aperture provided on each foot-receiving element and configured to receive a head portion of each releasable foot element, which head portion is provided with a retaining section configured to cooperate, upon axial insertion of the head portion inside the mounting aperture, with a plurality of spring-loaded retaining elements provided on each foot-receiving element and emerging inside the mounting aperture. A spacing may additionally be provided between each foot-receiving element and each releasable foot element to allow lateral insertion of a tool for the purpose of releasing the releasable foot element from the foot-receiving element.

In this latter context, each releasable foot element may advantageously be further provided with a lower mounting aperture configured and dimensioned to receive a head portion of another foot element, each releasable foot element being provided with a plurality of spring-loaded retaining elements emerging inside the lower mounting aperture and configured to cooperate with and retain the retaining section of another foot element upon axial insertion of the head portion inside the lower mounting aperture.

According to a further embodiment of the invention, through-holes are provided in the main structural body and the first and second lateral flanges next to the toggle latch components, which through-holes extend from an upper surface to a lower surface of the main structural body and said first and second lateral flanges.

The pallet module may furthermore comprise a smart tag providing identification and traceability of the pallet module. This is especially of interest in the context of the potential application of the present invention to enable the so-called Physical Internet (PI) global logistics model.

Also claimed is an assortment of pallet modules in accordance with the aforementioned invention produced in at least two different sizes, wherein said assortment of pallet modules includes a unit-size pallet module whose main structural body exhibits a unit size and at least one larger-size pallet module whose main structural body exhibits a length corresponding to an integer multiple of a length of the main structural body of the unit-size pallet module, the unit-size pallet module and the at least one larger-size pallet module being combinable with one another.

In accordance with a preferred embodiment of the assortment of pallet modules, the peripheral border of the main structural body of the unit-size pallet module exhibits a square shape. In this latter context, the peripheral border of the main structural body of each larger-size pallet module may likewise exhibit a square shape. The length of the main structural body of the unit-size pallet module may in particular be comprised within a range of 150 mm to 300 mm.

The assortment of pallet modules preferably includes at least two types of larger-size pallet modules, namely a medium-size pallet module and a large-size pallet module.

The length of the main structural body of each pallet module of the assortment may in particular be comprised withing a range of 150 to 1,200 mm.

This smart modular concept provides unprecedented benefits, especially in terms of freight logistics and environmental sustainability. In particular, the underlying structure and concept of the invention, is simple, yet provides substantial flexibility in the pallet assemblies that can be built on the basis of the relevant assortment of pallet modules. The dimensions and structure of the relevant pallet modules can be selected to boost efficiency and ease of use. In fact, the pallet modules can be assembled (and disassembled) very easily and quickly, and the dimensions thereof can be optimized to ensure that substantially all of the available shipment space can be exploited, thereby drastically reducing waste as well as packaging and shipment costs. In addition, the pallet modules are designed to be reused many times, thereby ensuring greater sustainability and reducing carbon footprint as a result compared to existing pallet solutions.

Furthermore, a standardisation of the pallet modules, which may be used to create pallet assemblies of multiple desired sizes meeting a larger variety of needs, favours and enables a truly circular economy. This enables substantial cost reductions by an order of magnitude compared to existing solutions. This furthermore offers substantially greater flexibility in optimising usage of available shipment space. Finally, a circular economy offers the ability to integrate digital solutions for efficiently managing, monitoring and tracking individual pallet modules.

Also claimed is a pallet assembly configured to act as a self-supporting platform allowing the handling and transportation of goods, which pallet assembly is built of multiple pallet modules according to the invention, which pallet modules are nested within and interlocked with one another.

Further claimed is the use of the pallet module, of the assortment of pallet modules, or of the pallet assembly for freight logistics, warehousing, transport and/or shipment purposes or for intralogistics purposes.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIGS. 2B and 2C are exploded views of one of the foot elements of FIG. 2A shown in isolation;

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the embodiments disclosed herein.

As described herein, when two or more parts or components are described as being connected, secured or coupled to one another, they can be so connected, secured or coupled directly to each other or through one or more intermediary parts.

In the context of the present invention, the expressions "pallet module" and "pallet assembly" are understood to refer to self-supporting platforms configured to allow the handling and transportation of goods, as used in particular for freight logistics, warehousing, transport and/or shipment purposes. Other similar purposes may also come into consideration, including e.g. intralogistics, namely the logistical handling of goods within the walls of a production or distribution center. More specifically, a pallet assembly according to the invention is built of multiple pallet modules which are nested within and interlock with one another to form a platform that is adapted in particular to support and allow transport and shipment of goods or equipment, be it by ground, sea or air transportation.

The invention will be described in relation to various embodiments of pallet modules as depicted in FIGS. 1A-H to 13A-B, which pallet modules are each configured to allow formation of a nested pallet assembly of at least two similar pallet modules as schematically illustrated, by way of illustration, in FIGS. 9A and 9B. While some features of the invention will be discussed with reference to FIGS. 1A-H to 2A-C and 5A-B to 8, it shall be appreciated that the relevant considerations apply by analogy to the embodiments shown in FIGS. 3A-C, 4A-C and 10A-B to 13A-B.

Figure 1A:
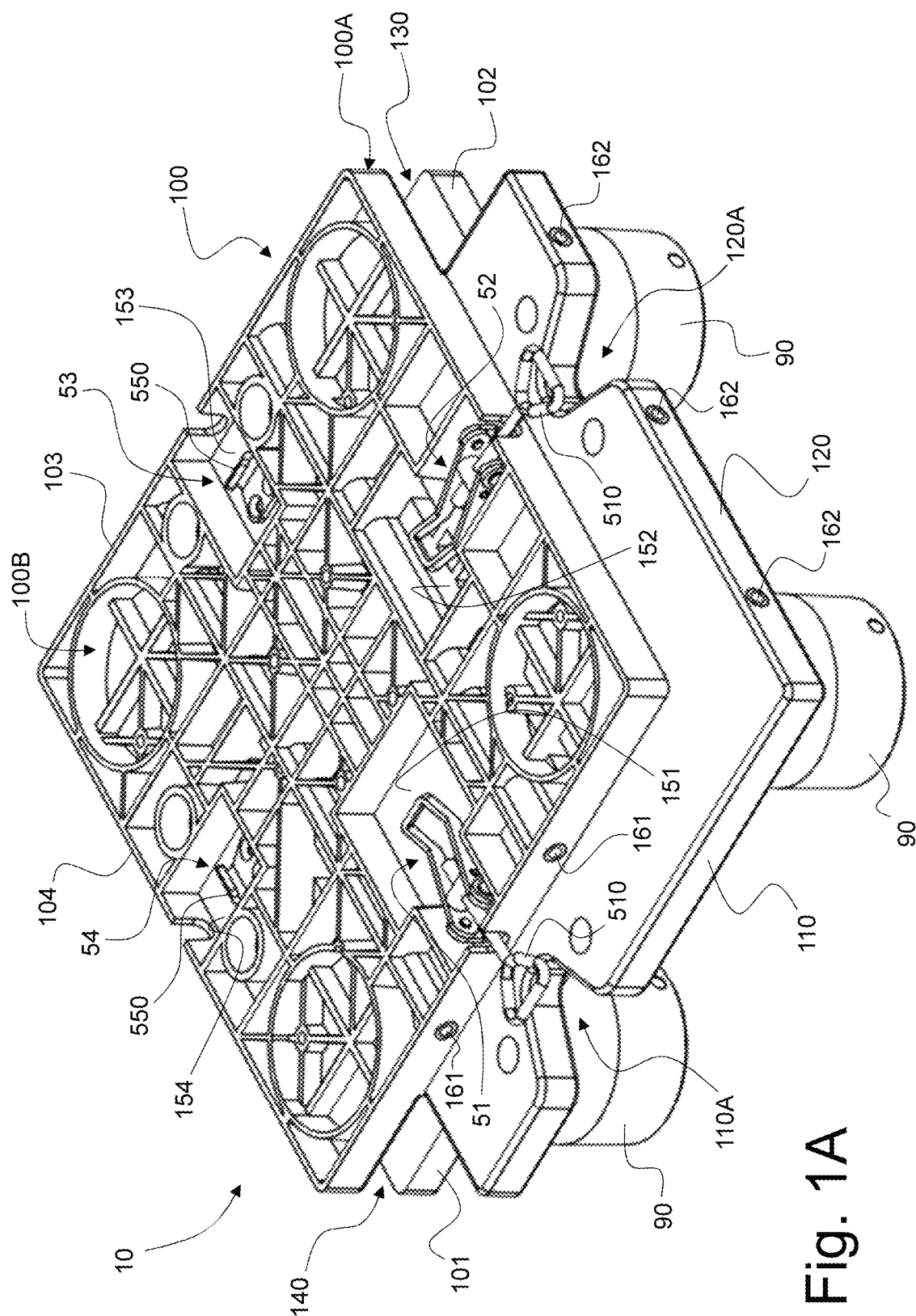
FIG. 1A is a perspective view of a pallet module, seen from an upper angle, in accordance with a first embodiment of the present invention.
Figure 1B:
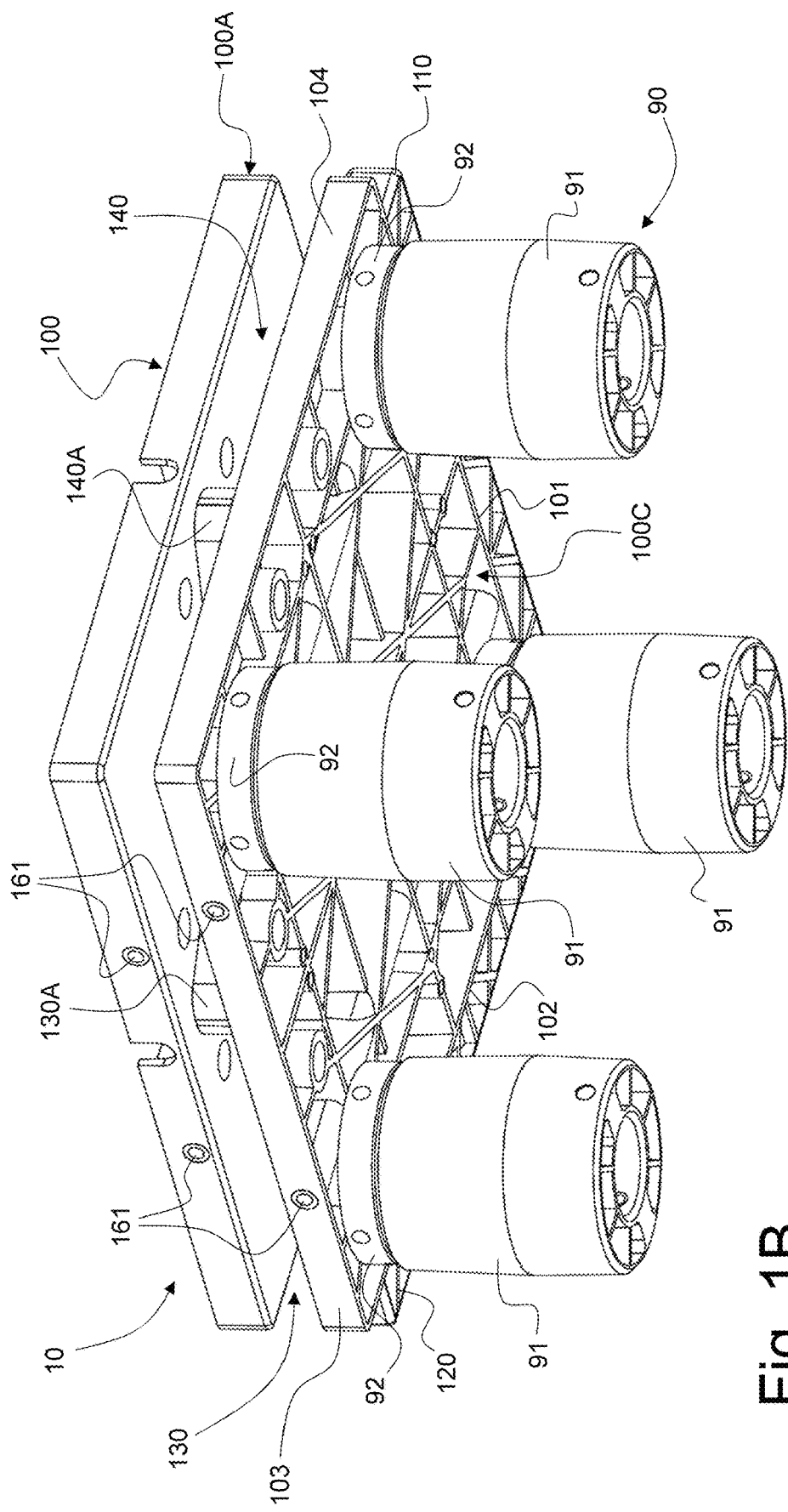
FIG. 1B is a perspective view of the pallet module of FIG. 1A seen from a lower angle.

FIGS. 1A and 1B are two perspective views, taken from different viewing angles, of a pallet module, designated globally by reference numeral 10, in accordance with a first embodiment of the invention. The same pallet module 10 is shown from the top and bottom in FIGS. 1C and 1D and from all four sides in FIGS. 1E to 1H.

The pallet module 10 (as well as the other embodiments of pallet modules described herein) is configured to allow formation of a nested pallet assembly of at least two similar pallet modules, be it another identical pallet module 10 or e.g. a compatible pallet module 20 or 30 as for instance shown in FIGS. 3A-C or FIGS. 4A-C.

Figure 1C:
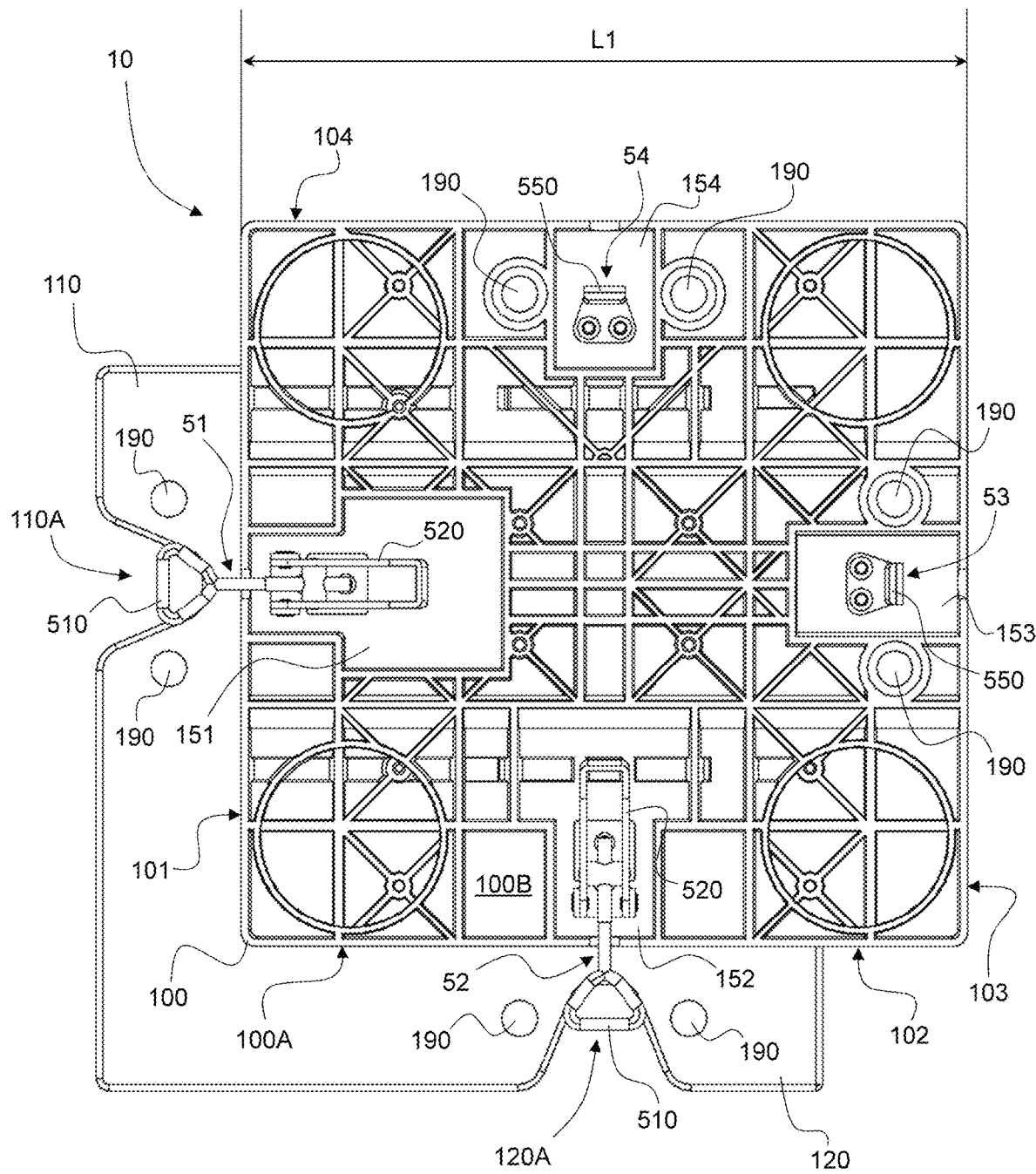
FIG. 1C is a top view of the pallet module of FIG. 1A.
Figure 1D:
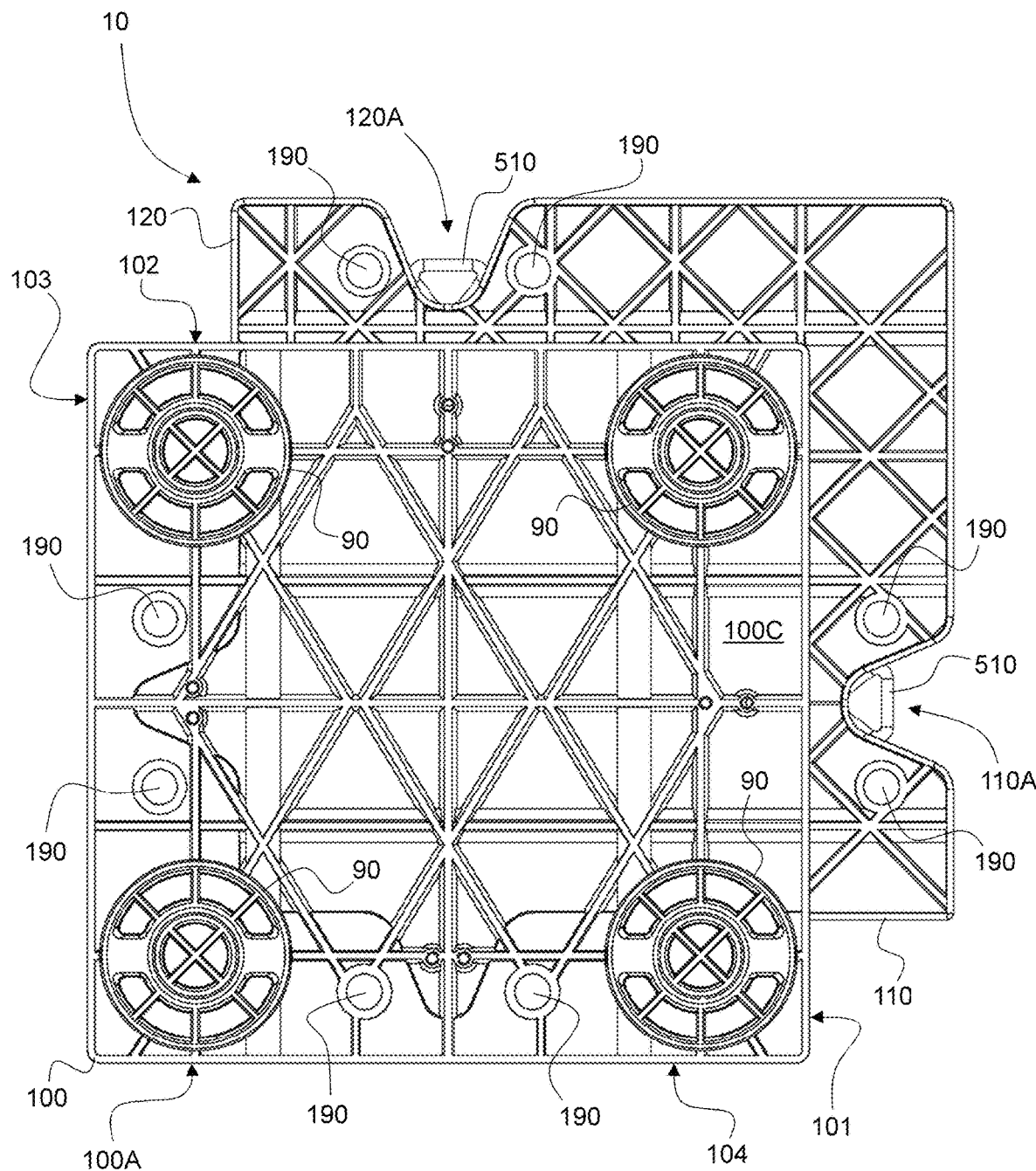
FIG. 1D is a bottom view of the pallet module of FIG. 1A.
Figure 1E:
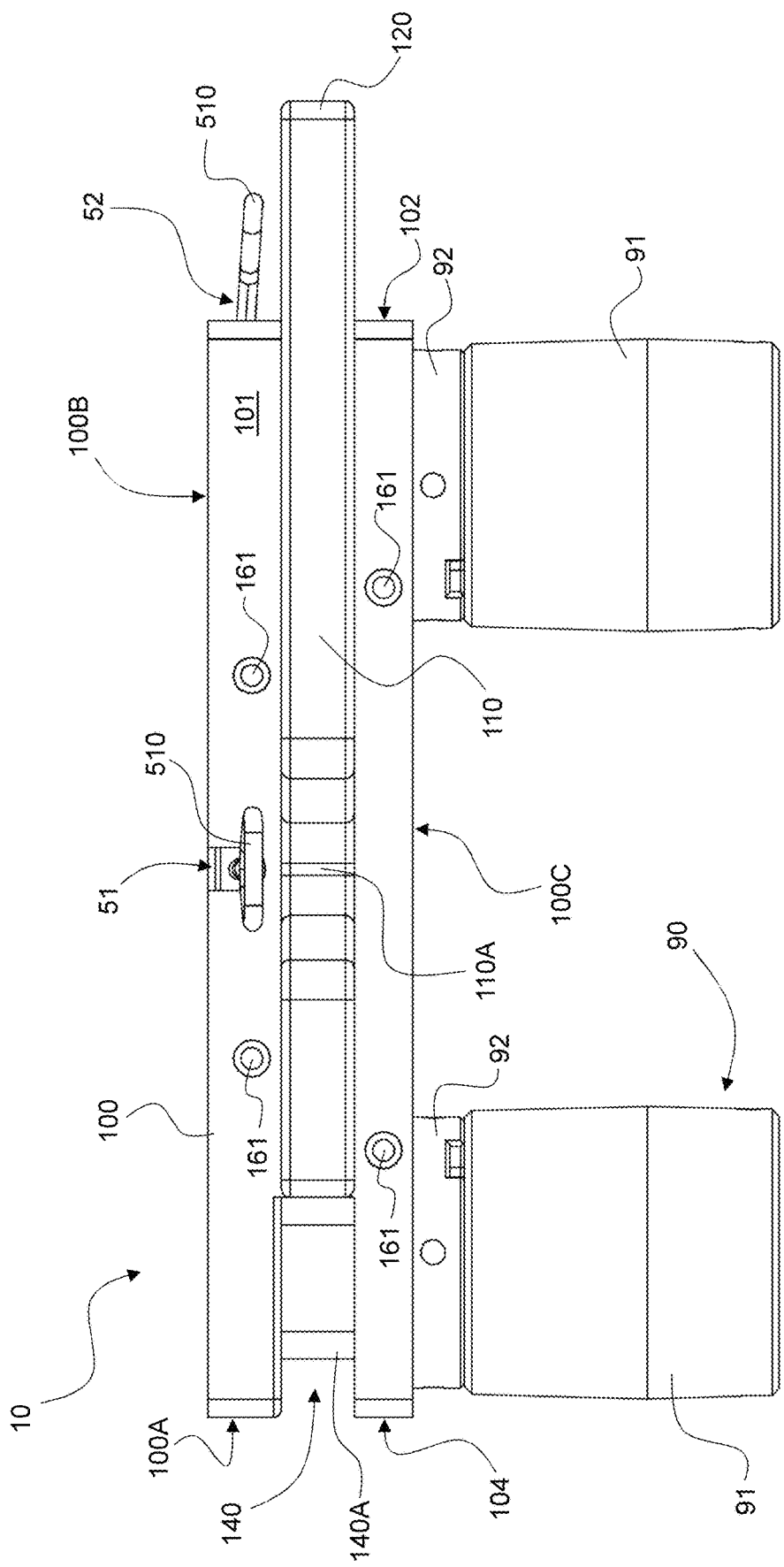
FIG. 1E is a side view of the pallet module of FIG. 1A as seen from a first side.
Figure 1F:
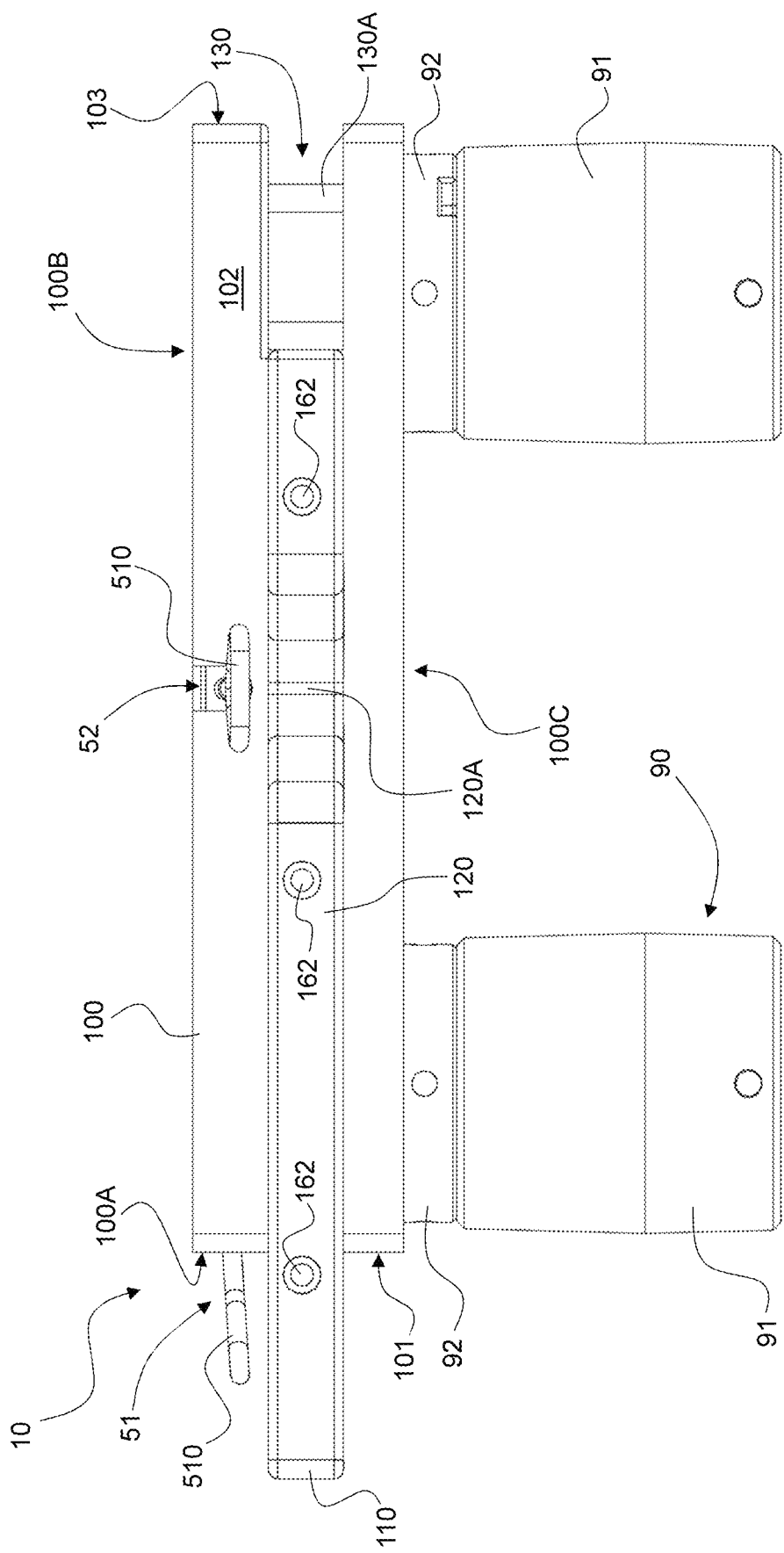
FIG. 1F is a side view of the pallet module of FIG. 1A as seen from a second side.
Figure 1G:
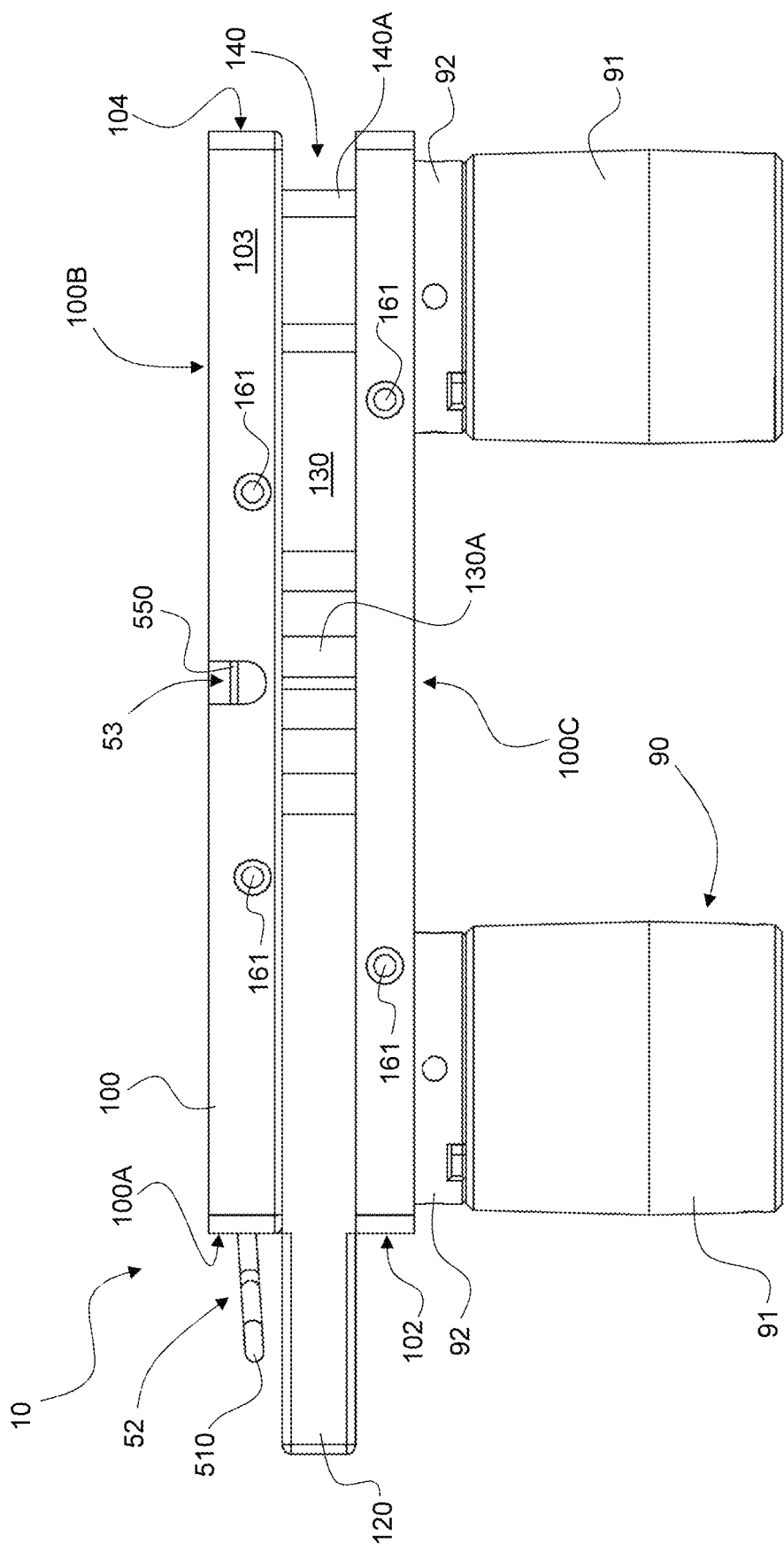
FIG. 1G is a side view of the pallet module of FIG. 1A as seen from a third side.
Figure 1H:
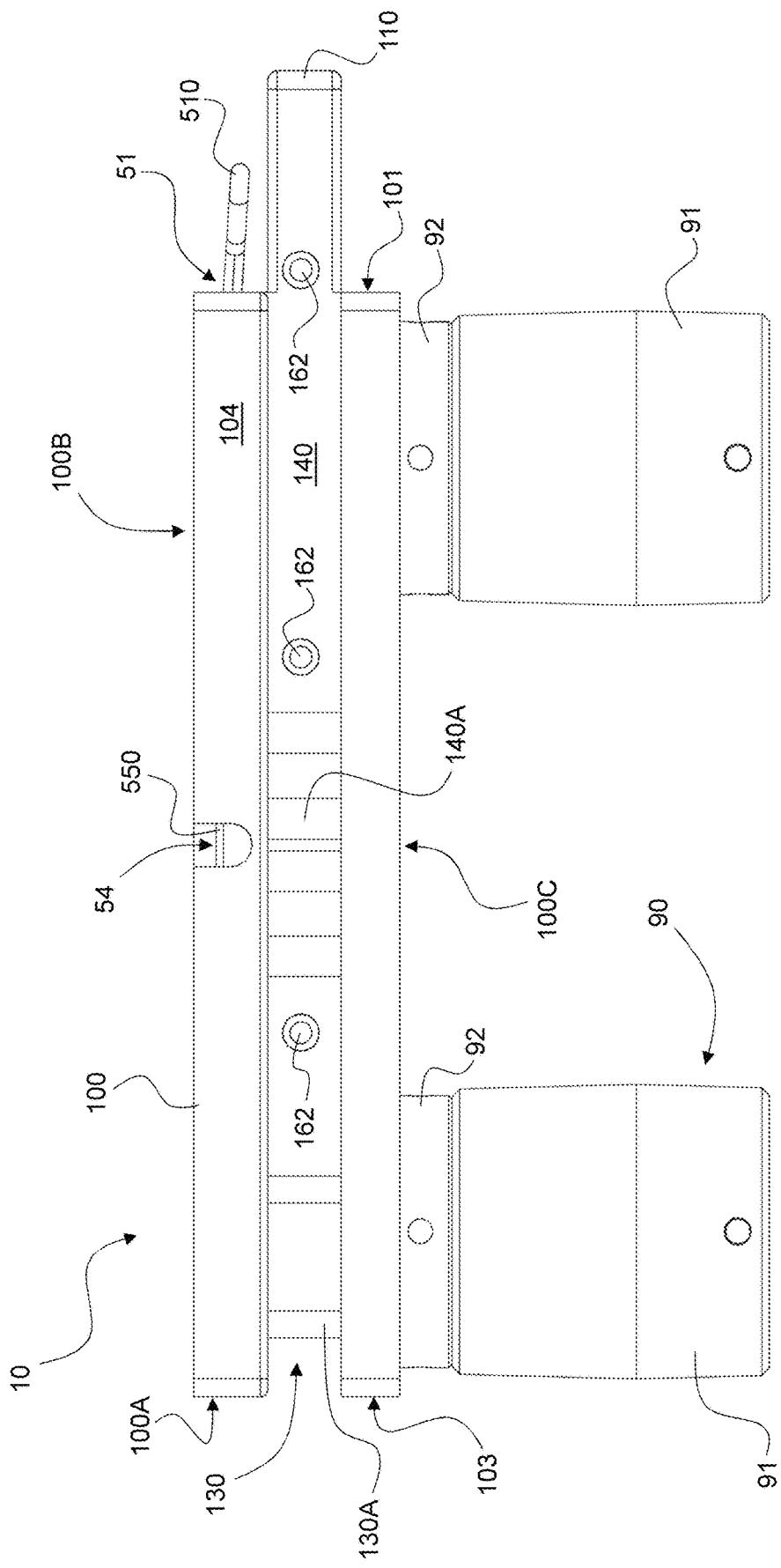
FIG. 1H is a side view of the pallet module of FIG. 1A as seen from a fourth side.

The pallet module 10 comprises a main structural body 100 exhibiting a generally quadrilateral peripheral border 100A with first to fourth lateral sides 101-104 extending between upper and lower sides 100B, 100C of the main structural body 100. The first to fourth lateral sides 101-104 are here numbered in sequence in the counter-clockwise direction when looking at the pallet module 10 from the top (as shown in FIG. 1C). The pallet module 10 further comprises a foot structure 90 that is disposed on the lower side 100C of the main structural body 100. The foot structure 90 could be designed as a fixed foot structure comprising one or more fixed foot elements made integral with or permanently attached to the main structural body 100. By way of preference, however, the foot structure 90 is configured as a releasable foot structure comprising one or more releasable foot elements 91 that can each be secured to or removed from a corresponding foot-receiving element 92 provided on the lower side 100C of the main structural body 100.

In accordance with this first embodiment, the peripheral border 100A here exhibits a square shape with a defined length (and width) L1 as reproduced on FIG. 1C. By way of illustration, it will be assumed that the length L1 is of approximately 300 mm, but any other length could be contemplated. From a general perspective, the length of the pallet module of the invention may especially be within a range of the order of 150 mm to 1,200 mm.

More specifically, the pallet module 10 depicted in FIGS. 1A-H forms one pallet module of an assortment of pallet modules (including the pallet module 20 of FIGS. 3A-C and the pallet module 30 of FIGS. 4A-C) that are combinable together to form a nested pallet assembly. In that regard, the pallet module 10 will also be referred as a "unit-size pallet module", namely a pallet module 10 whose main structural body exhibits a unit size of here L1×L1, all other pallet modules of the relevant assortment exhibiting a larger size. More precisely, the larger-size pallet modules (e.g. the pallet modules 20 and 30 of FIGS. 3A-C and FIGS. 4A-C, respectively) are pallet modules whose main structural body (200, resp. 300) exhibits a length (L2, resp. L3) corresponding to an integer multiple of the length L1 of the main structural body 100 of the unit-size pallet module 10. In that respect, length L1 will also be referred to as "unit length".

Figure 3A:
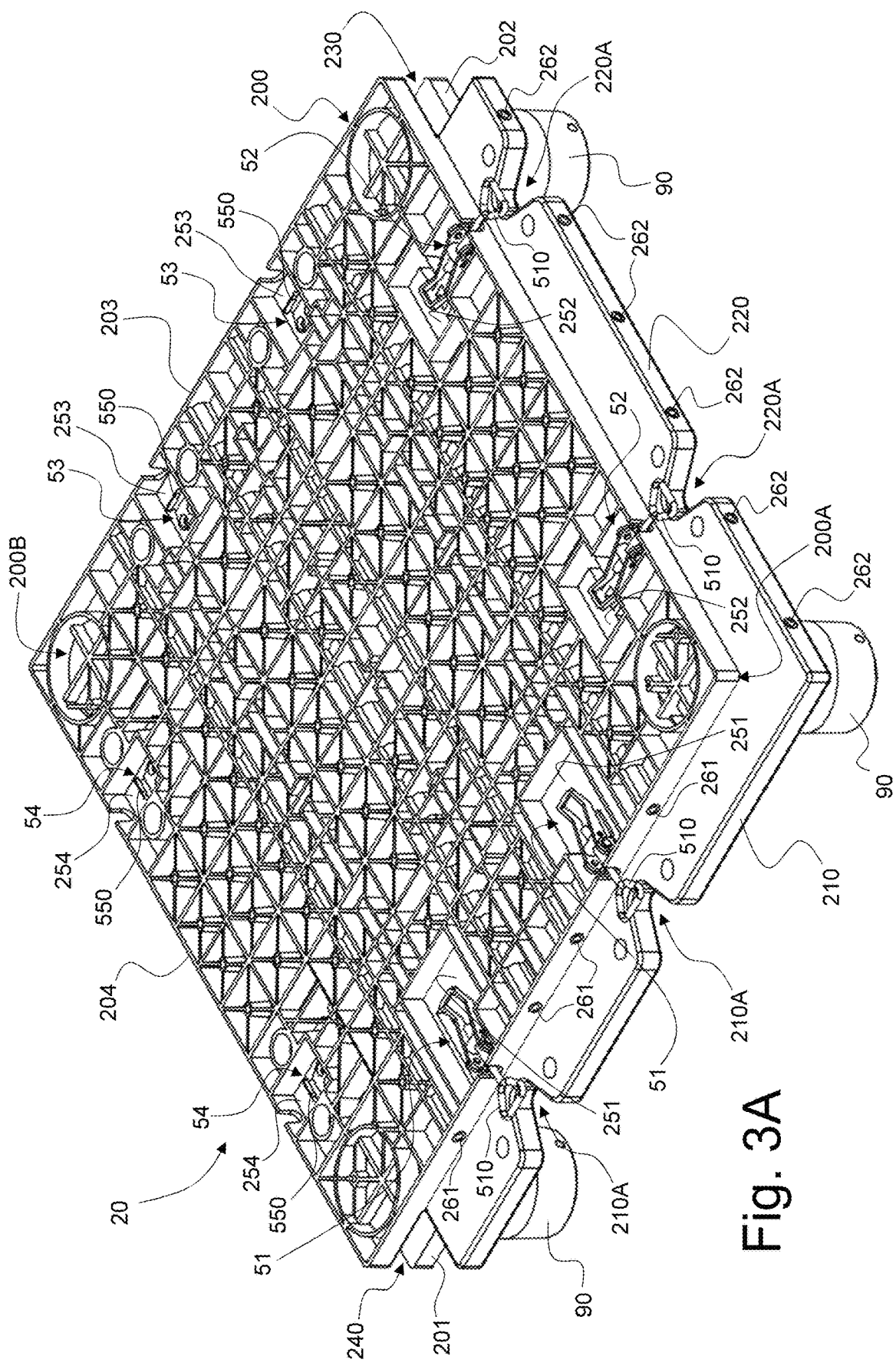
FIG. 3A is a perspective view of a pallet module, seen from an upper angle, in accordance with a second embodiment of the present invention.
Figure 3B:
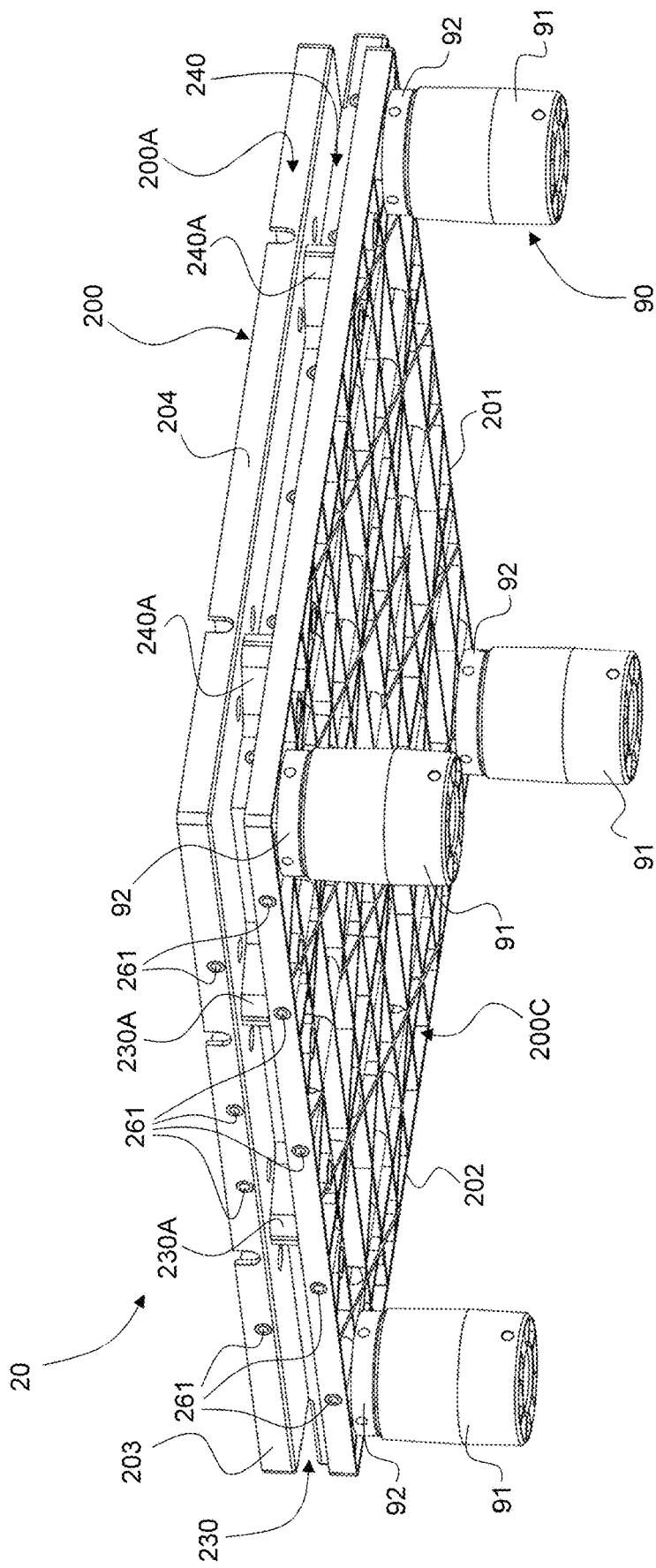
FIG. 3B is a perspective view of the pallet module of FIG. 3A seen from a lower angle.
Figure 3C:
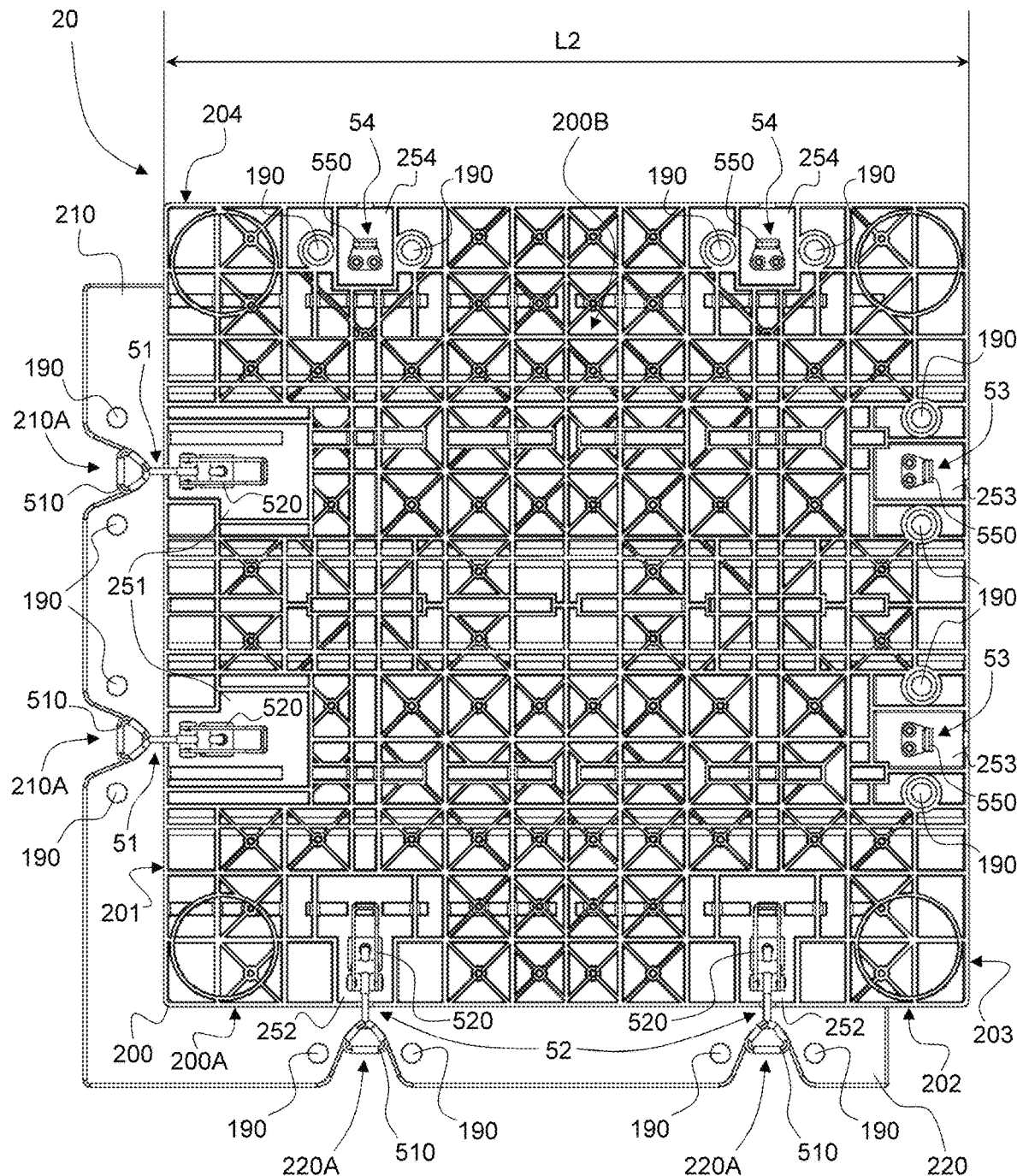
FIG. 3C is a top view of the pallet module of FIG. 3A.
Figure 4A:
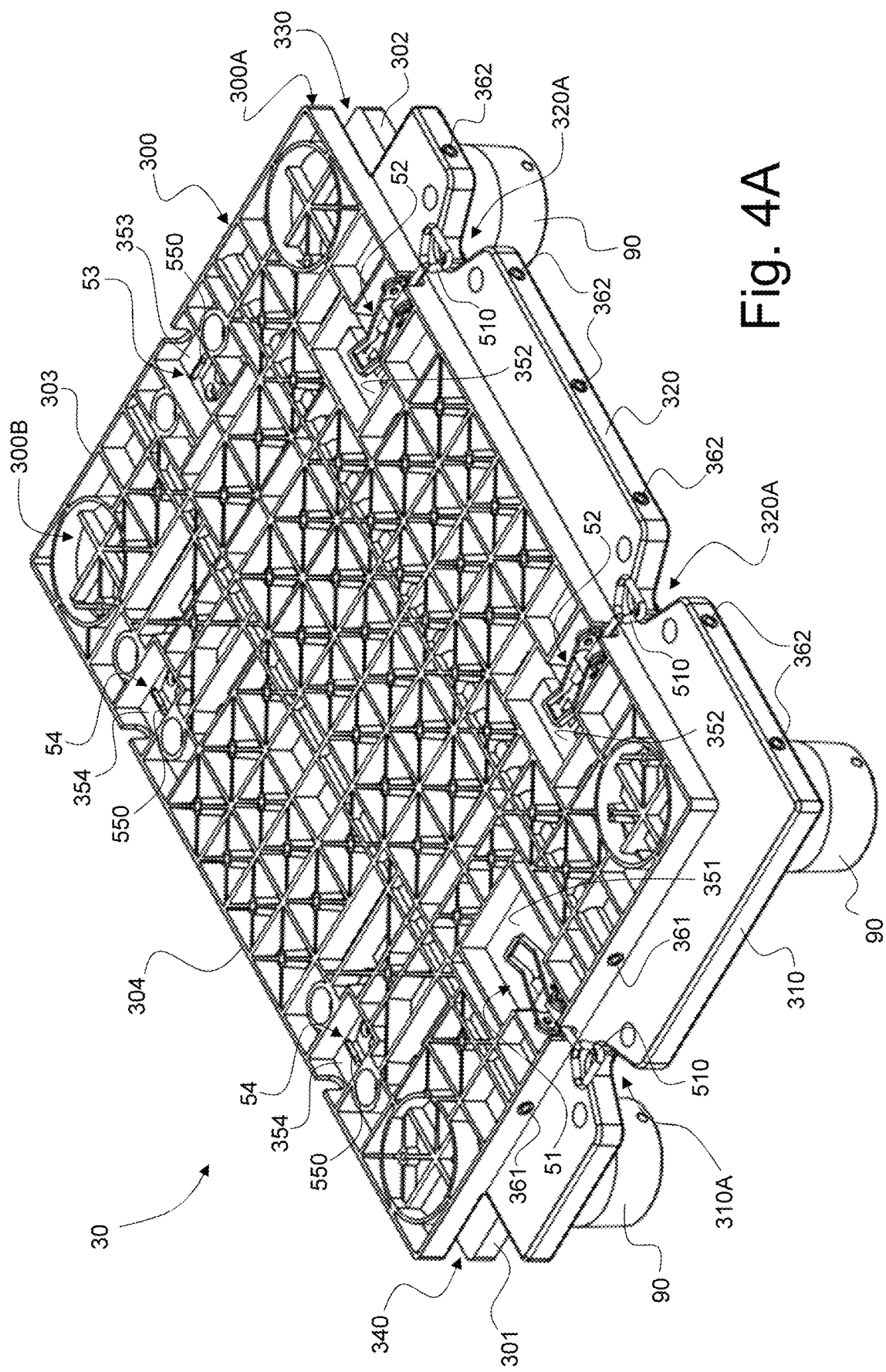
FIG. 4A is a perspective view of a pallet module, seen from an upper angle, in accordance with a third embodiment of the present invention.
Figure 4B:
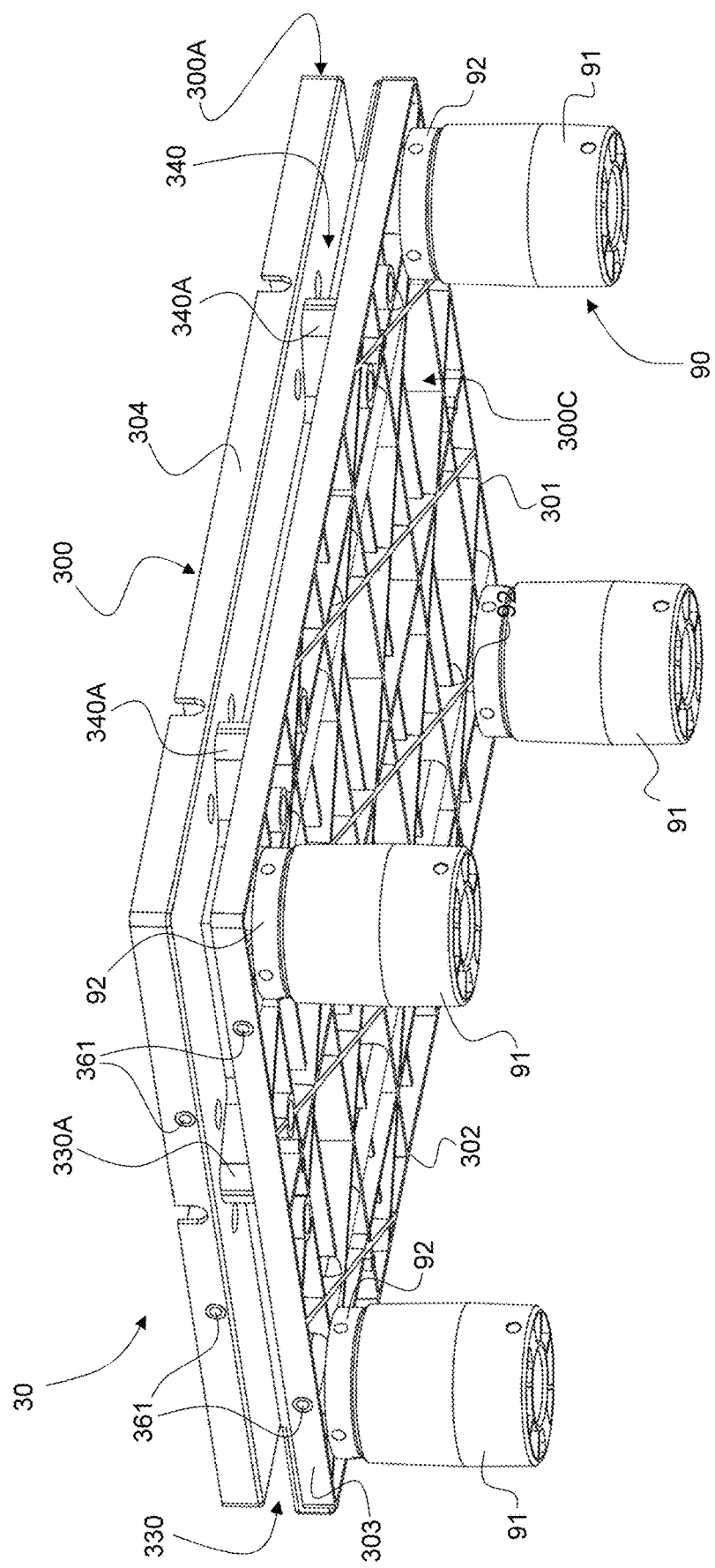
FIG. 4B is a perspective view of the pallet module of FIG. 4A seen from a lower angle.
Figure 4C:
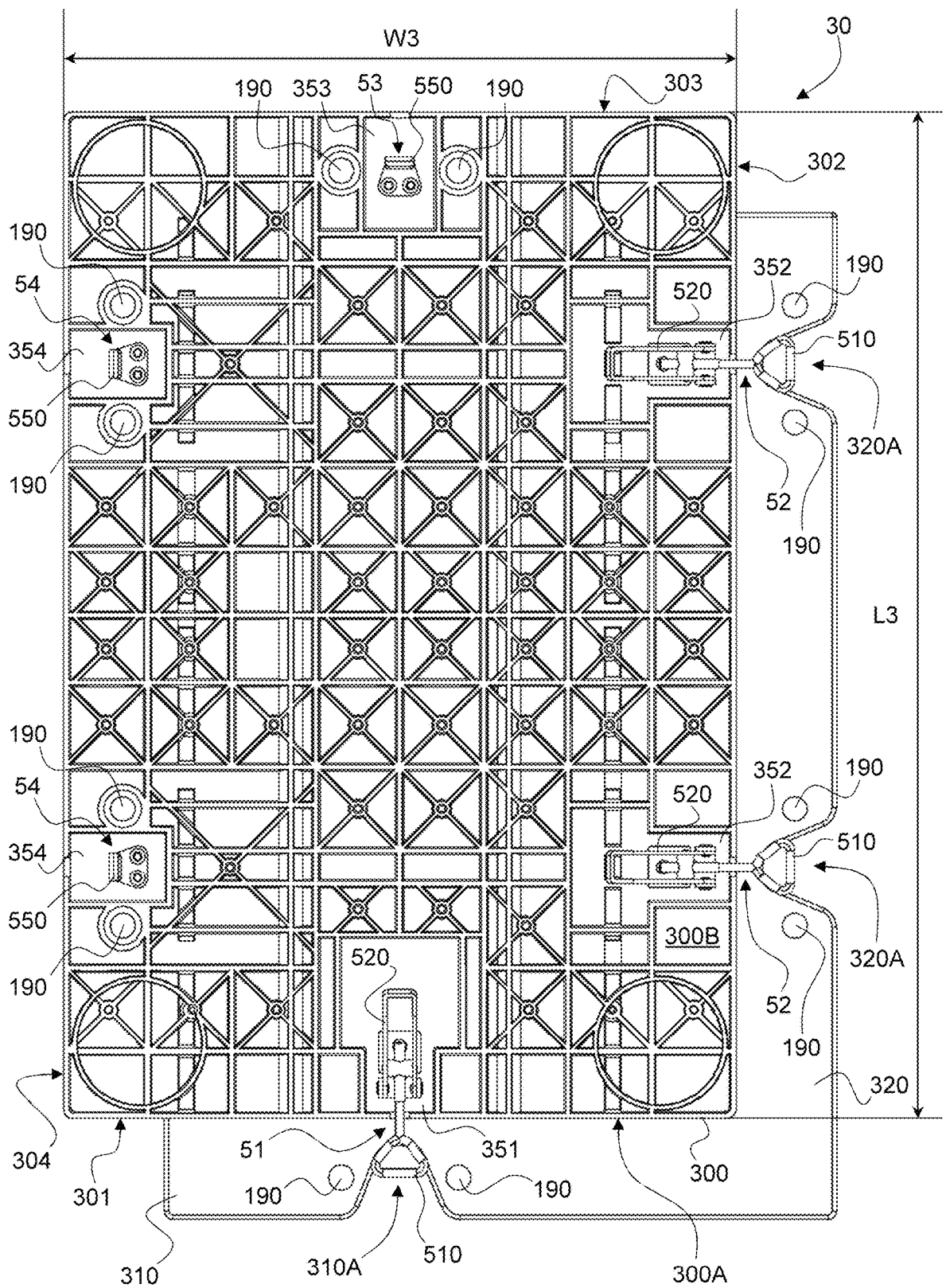
FIG. 4C is a top view of the pallet module of FIG. 4A.

One particular feature of the pallet module 10 of FIGS. 1A-H, which is likewise reflected on the pallet module 20 of FIGS. 3A-C and the pallet module 30 of FIGS. 4A-C, is the presence of first and second lateral flanges 110, 120 extending outwardly from the peripheral border 100A of the main structural body 100 along the first and second lateral sides 101, 102. These first and second lateral flanges 110, 120 form a first part of the mating system that is configured to allow nesting of multiple pallet modules within one another. As this will be appreciated hereafter, the first and second lateral flanges 110, 120 are configured to cooperate with a corresponding side portion of another similar pallet module, namely another part of the relevant mating system.

As shown in FIGS. 1A-1H, the main structural body 100 exhibits first and second lateral grooves 130, 140 extending inwardly from the peripheral border 100A of the main structural body 100 along the third and fourth lateral sides 103, 104. These first and second lateral grooves are each configured to receive the first and second lateral flanges, respectively, of another similar pallet module (including e.g. the first and second lateral flanges 110, 120 of another pallet module 10) so that the first, respectively second lateral flange of said other similar pallet module nests within the first, respectively second lateral groove 130, 140, thereby forming a nested pallet assembly.

As this is visible from the illustrations of FIGS. 1A-H (as well as FIGS. 3A-C and 4A-C), the first and second lateral flanges 110, 120 are advantageously offset sideways with respect to the first and second lateral sides 101, 102. This optimizes the available space for nesting pallet modules one within the other, and especially ensures that load can adequately be supported at each corner of the pallet module. In the illustrated example, in view of the fact that the first and second lateral sides 101, 102 are adjacent sides, it will be appreciated that the first and second lateral flanges 110, 120 jointly form an L-shaped lateral flange on the side of the pallet module, which constitutes a highly characteristic feature of this embodiment of the invention. This same feature is also present on the other illustrated embodiments of the pallet modules of FIGS. 3A-C and 4A-C.

In addition to the aforementioned mating system 110, 120, 130, 140, the pallet module 10 further comprises a securing system configured to allow the pallet module 10 to be secured to or released from another similar pallet module of the nested pallet assembly. This securing system includes first and second toggle latch components 51, 52 that are arranged in the vicinity of the first and second lateral sides 101, 102, respectively, and third and fourth toggle latch components 53, 54 that are arranged in the vicinity of the third and fourth lateral sides 103, 104, respectively. The first and second toggle latch components 51, 52 are each configured to cooperate and interlock with the third and fourth toggle latch components 53, 54, respectively, of another similar pallet module of the nested pallet assembly, to form releasable toggle latches 500 (see FIG. 8) allowing the pallet module 10 to be secured to or released from the other similar pallet module.

Figure 8:
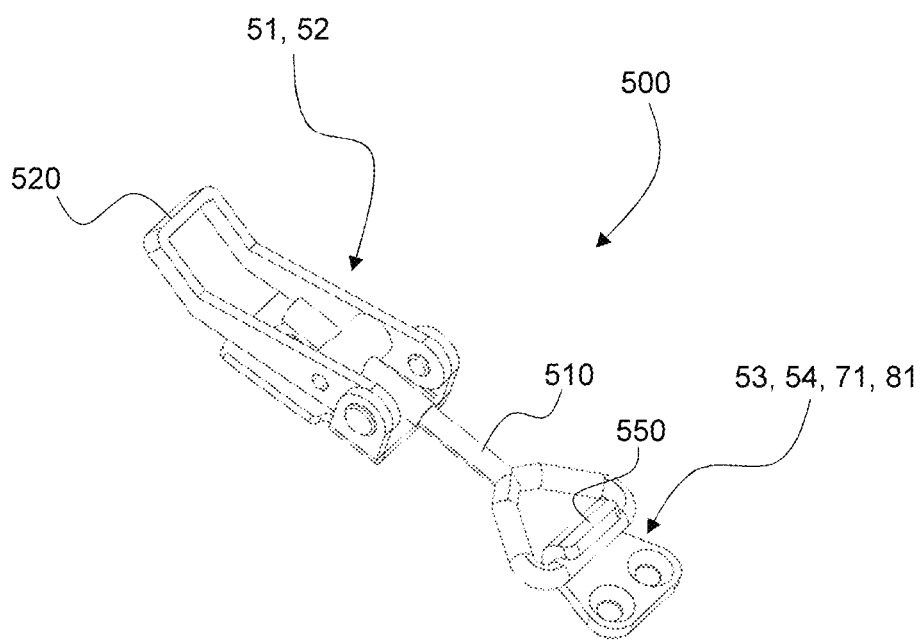
FIG. 8 is a perspective view of a releasable toggle latch as used for securing two adjacent pallet modules one to the other in accordance with a preferred embodiment of the invention.

As shown in FIG. 8, the resulting releasable toggle latches 500 typically comprises a spring-loaded latch element with a moveable latch section 510 that extends outwardly to cooperate with a catch element comprising a catch section

550. The spring-loaded latch element is preferably manually actuatable and further comprises a handle section 520 that is mechanically linked to the moveable latch section 510 to allow manual actuation of the latch element. Each releasable toggle latch 500 is thus formed of two connectable or disconnectable sections, one being provided on one pallet module of the pallet assembly, and the other on the other, adjacent pallet module of the pallet assembly.

By way of preference, the first to fourth toggle latch components 51-54 are provided on the upper side 100B of the main structural body 100, as shown, namely at least partly within recesses 151-154 formed below an upper surface of the upper side 100B of the main structural body 100. The first to fourth toggle latch components 51-54 could alternatively be provided on the lower side 100C of the main structural body 100, but this constitutes a less favourable solution.

In the illustrated embodiment, the aforementioned spring-loaded latch element is advantageously located on the side where the first, respectively second lateral flange is provided. This provides for some protection of the moveable latch section 510 thanks to the presence of the neighbouring lateral flange. Referring to FIGS. 1A-H, the first and second toggle latch components 51, 52 thus consist of spring-loaded latch elements whose moveable latch section 510 extends outwardly beyond the peripheral border 100A of the main structural body 100, i.e. beyond the first and second lateral sides 101, 102, respectively. As a consequence, the third and fourth toggle latch components 53, 54 consist of catch elements whose catch section 550 is located entirely with the relevant recesses 153, 154, respectively. As illustrated, a corresponding clearance is formed in all four lateral sides 101 to 104 to allow passage of the relevant portion of the moveable latch section 510, thereby allowing assembly of multiple pallet modules together.

In accordance with a particularly preferred embodiment, each of the first and second lateral flanges 110, 120 exhibits at least one positioning notch 110A, respectively 120A, formed along an outer edge of the first and second lateral flanges 110, 120. In the illustrations of FIGS. 1A-H, only one positioning notch 110A, respectively 120A, is formed along the outer edge of the first and second lateral flanges 110, 120. Likewise, each of the first and second lateral grooves 130, 140 exhibits at least one corresponding protrusion 130A, respectively 140A, configured to mate with a corresponding positioning notch provided on the first and second lateral flanges of another similar pallet module.

In accordance with a particularly preferred variant, as shown, a position of each positioning notch 110A, 120A along the outer edge of the first and second lateral flanges 110, 120 and a position of each protrusion 130A, 140A within the first and second lateral grooves coincide with a position of each of the first to fourth toggle latch components 51-54 along the first to fourth lateral sides. This same principle is reflected on the other pallet modules of the same assortment and guarantees a precise and accurate positioning of the pallet modules one with respect to the other. This further ensures that the mating system 110, 120, 130, 140 ideally supports load applied on the pallet assembly and provides adequate resistance and robustness against shear stress.

By way of preference, the first and second lateral flanges 110, 120 are formed integrally with the main structural body 100, which ensures structural integrity of the entire pallet module. One could alternatively contemplate to build the pallet module from multiple pallet components that are assembled one with the other.

An integral structure is however preferred in that the pallet module can be mass-produced, for instance by moulding. In that respect, the main structural body 100 and first and second lateral flanges 110, 120 can especially be made of plastic or biopolymer material, which can especially be shaped into the desired configuration by moulding. In that respect, one may appreciate that the main structural body 100 shown in FIGS. 1A-H is advantageously structured to form ribs and valleys to save weight, while maintaining the structural integrity of the main structural body 100. High-density polyethylene (HDPE) may be an optimal candidate in view of its highly crystalline structure which makes it a strong, high-density, moderately stiff plastic ideal for the intended purpose. HDPE (like some other polymer materials) is furthermore approved for contact with food products. In addition, HDPE is one of the easiest to recycle and has the highest recycling rate amongst polymer materials (>30%), benefiting from well-established recycling channels. Biopolymer materials could also come into consideration as a viable and sustainable alternative.

In this latter context especially, it is of interest for structural integrity to additionally provide a plurality of reinforcing element extending within the main structural body and the first and/or second lateral flanges. Such reinforcing elements allow distribution of forces over the full surface area of the pallet module and thereby substantially improve stress and load resistance of the resulting pallet assembly. These reinforcing elements can be made of any suitable material, especially a metal, such as aluminium, a metal alloy or a composite material.

Reinforcing elements are shown in FIGS. 1A-H as longitudinal rod elements 161, 162 that extend within the main structural body 100 and the first and second lateral flanges 110, 120, between upper and lower surfaces thereof. More precisely, in the illustrated embodiment, a first series of longitudinal rod elements 161 extends in a first direction (here from the first lateral side 101 to the third lateral side 103 of the main structural body 100, both above and below the location of the first and second lateral flanges 110, 120), while a second series of longitudinal rod elements 162 extends in a second direction distinct from the first direction (here perpendicularly to the first series of rod elements 161, within the thickness of the first and second lateral flanges 110, 120).

The reinforcing elements 161, 162 can especially be integrated within the main structural body 100 and the first and second lateral flanges 110, 120, made of plastic or biopolymer material, by combined moulding techniques, where the relevant reinforcing elements 161, 162 are prepositioned inside the mould prior to injection of the plastic or biopolymer material to ultimately form a combined metal-plastic structure.

Figure 2A:
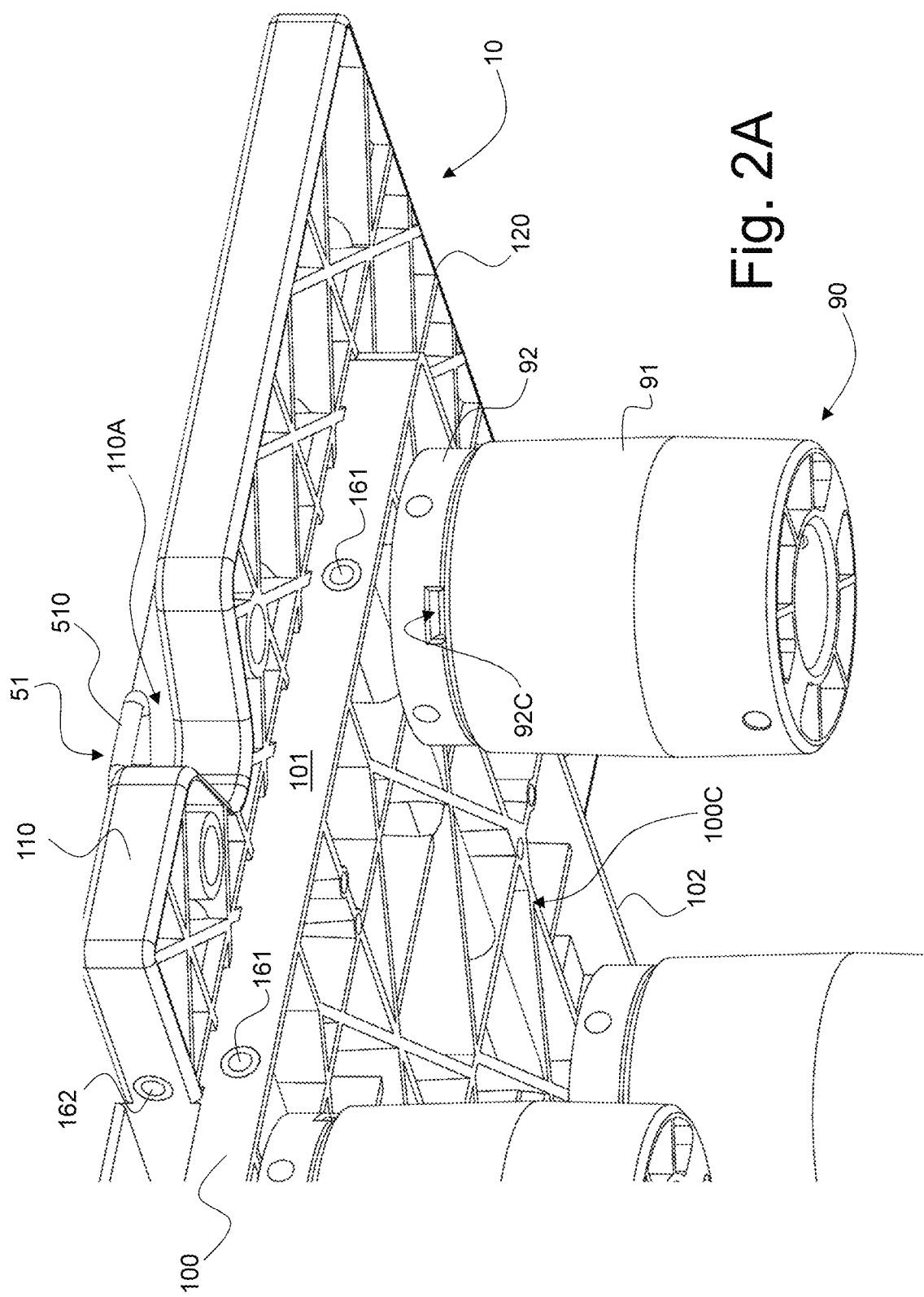
FIG. 2A is a partial perspective view of the pallet module of FIG. 1A as seen from a lower angle and which shows one of a plurality of foot elements of a foot structure provided on a lower side of the pallet module in accordance with another aspect of the invention.

FIG. 2A is a partial perspective view of the pallet module of FIG. 1A-H as seen from a lower angle and which shows one of a plurality of foot elements of the foot structure 90 provided on the lower side 100C of the main structural body 100 of the pallet module 10.

In accordance with a preferred variant of the invention, as illustrated, the foot structure 90 is configured as a releasable foot structure comprising one or more releasable foot elements 91 that can each be secured to or removed from a corresponding foot-receiving element 92 provided on the lower side 100C of the main structural body 100.

By way of preference, each releasable foot element 91 is connected to the foot-receiving element 92 by means of a spring-loaded locking mechanism (an example of which is shown in greater detail in FIGS. 2B and 2C) that is configured to allow the releasable foot element 91 to be manually inserted into and automatically interlock with the foot-receiving element 92 without this requiring any tool, the spring-loaded locking mechanism being further configured to allow selective manual release of the releasable foot element 91 from the foot-receiving element 92. This actually forms another aspect of the invention, which, although advantageously combinable with the aforementioned pallet module structure, could be used independently thereof.

FIGS. 2B and 2C are exploded views of a particularly advantageous configuration of the releasable foot element 91 and foot-receiving element 92, where the spring-loaded locking mechanism includes a mounting aperture 92A provided on each foot-receiving element 92 (see FIG. 2C) and configured to receive a head portion 91A of each releasable foot element 91. This head portion 91A is provided with a retaining section 91B, namely a retaining groove forming a neck section on the head portion 91A, which retaining section 91B is configured to cooperate, upon axial insertion of the head portion 91A inside the mounting aperture 92A, with a plurality of spring-loaded retaining elements 95 provided on each foot-receiving element 92 and emerging inside the mounting aperture 92A. In the present example, four such retaining elements 95 are distributed about the mounting aperture 92A and only part thereof is accordingly visible in FIG. 2C. The spring-loaded retaining elements 95 can be simple elongated elements that are mounted inside radial holes formed in the foot-receiving element 92 and that are urged towards the interior of the mounting aperture 92A by means of springs.

Each releasable foot element can further be provided with a lower mounting aperture 91C configured and dimensioned to receive a head portion 91A of another foot element 91, each releasable foot element 91 being provided with a plurality of spring-loaded retaining elements 95* (similar to the spring-loaded retaining elements 95 provided in the foot-receiving element 92) emerging inside the lower mounting aperture 91C and configured to cooperate with and retain the retaining section 91B of another foot element 91 upon axial insertion of the head portion 91A inside the lower mounting aperture 91C. In this way, multiple foot elements 91 can be assembled together to form component assemblies that are easier and more convenient to handle, especially for shipment purposes. In the illustrated example, only two spring-loaded retaining elements 95* are provided, which is sufficient for the contemplated purpose. The force exerted by these spring-loaded retaining elements 95* can furthermore be selected to facilitate purely manual release of the foot elements 91 one from another.

Also shown in FIGS. 2A-C is a spacing 92C provided between each foot-receiving element 92 and each releasable foot element 91. This spacing 92C is configured to allow lateral insertion of a tool, such as a crowbar or screwdriver, between the foot-receiving element 92 and the releasable foot element 91. Using the tool as a lever, the releasable foot element 91 can be easily released from the foot-receiving element 92.

Also visible in FIGS. 2B-C is a head portion 92B of the foot-receiving element 92. This head portion 92B is used for the purpose of securing the foot-receiving element 92 to the lower side 100C of the main structural body 100. In a manner similar to the aforementioned reinforcing elements 161, 162, the foot-receiving elements 92—or more precisely the head portion 92B thereof—can be integrated to the lower side 100C of the main structural body 100, made of plastic or biopolymer material, by combined moulding techniques.

FIGS. 3A-C are two perspective views, taken from different viewing angles, and a top view of a pallet module, designated globally by reference numeral 20, in accordance with a second embodiment of the invention, and which forms part of a same assortment of pallet modules as the pallet module 10 of FIGS. 1A-H. The pallet module 20 will also be referred as a "large-size pallet module".

FIGS. 4A and 4B are two perspective views, taken from different viewing angles, and a top view of a pallet module, designated globally by reference numeral 30, in accordance with a third embodiment of the invention, and which likewise forms part of a same assortment of pallet modules as the pallet module 10 of FIGS. 1A-H and the pallet module 20 of FIGS. 3A-C. The pallet module 30 will also be referred as a "medium-size pallet module".

The pallet modules 20 and 30 share a substantial number of common features with the pallet module 10, including:

a main structural body 200, resp. 300, exhibiting a generally quadrilateral peripheral border 200A, resp. 300A with first to fourth lateral sides 201-204, resp. 301-304, extending between upper and lower sides 200B, 200C, resp. 300B, 300C, of the main structural body 200, resp. 300;

first and second lateral flanges 210, 220, resp. 310, 320, extending outwardly from the peripheral border 200A, resp. 300A, of the main structural body 200, resp. 300, along the first and second lateral sides 201, 202, resp. 301, 302;

first and second lateral grooves 230, 240, resp. 330, 340, extending inwardly from the peripheral border 200A, resp. 300A, of the main structural body 200, resp. 300, along the third and fourth lateral sides 203, 204, resp. 303, 304;

a foot structure 90 disposed on the lower side 200C, resp. 300C, of the main structural body 200, resp. 300;

first and second toggle latch components 51, 52 arranged in the vicinity of the first and second lateral sides 201, 202, resp. 301, 302; and third and fourth toggle latch components 53, 54 arranged in the vicinity of the third and fourth lateral sides 203, 204, resp. 303, 304.

The first to fourth toggle latch components 51-54 are likewise provided on the upper side 200B, resp. 300B, of the main structural body 200, resp. 300, at least partly within corresponding recesses 251-254, resp. 351-354, formed below the upper surface of the upper side 200B, resp. 300B, of the main structural body 200, resp. 300.

One difference between the pallet module 20 of FIGS. 3A-C and the pallet module 10 of FIGS. 1A-H resides in the dimensions of the pallet module 20, or more exactly the dimensions of the main structural body 200. In accordance with this second embodiment, the peripheral border 200A here exhibits a square shape with a defined length (and width) L2 as reproduced on FIG. 3C, which is twice the unit length L1 of the unit-size pallet module 10 of FIGS. 1A-H, i.e. of approximately 600 mm in the illustrated example, hence the reason why this pallet module 20 is being referred to as the large-size pallet module.

Similarly, one difference between the pallet module 30 of FIGS. 4A-C and the pallet module 10 of FIGS. 1A-H resides in the dimensions of the pallet module 30, or more exactly the dimensions of the main structural body 300. In accordance with this third embodiment, the peripheral border 300A here exhibits a rectangular shape with a defined length L3 and defined width W3 as reproduced on FIG. 4C. The length L3 is likewise twice the unit length L1 of the unit-size pallet module 10 of FIGS. 1A-H, i.e. of approximately 600 mm in the illustrated example, but the width W3, in the illustrated example, is of approximately 400 mm, hence the reason why this pallet module 30 is being referred to as the medium-size pallet module.

The overall size of the pallet module 30 is specifically chosen in the illustrated example to correspond to exactly a quarter of the dimensions of a standard Euro-pallet which has a length of 1,200 mm and a width of 800 mm. In other words, assembling four medium-size pallet modules 30 in a square would lead to a pallet assembly exhibiting substantially the size of a standard Euro-pallet. Other dimensions could however be contemplated. The same principle could for instance be applied with regard to standard US pallets or the like.

As a result of the aforementioned choices of dimensions, and in order to ensure compatibility with e.g. the pallet module 10 of FIGS. 1A-H, the number of toggle latch components 51-54 on each side of the pallet module 20 is doubled, whereas only the number of second and fourth toggle latch components 52, 54 is doubled in the case of the pallet module 30. By the same token, each of the first and second lateral flanges 210, 220 and each of the first and second lateral grooves 230, 240 are provided with a pair of positioning notches 210A, 220A and a pair of protrusions 230A, 240A, respectively, whereas only the second lateral flange 320 and the second lateral groove 340 are each provided with a pair of positioning notches 320A and protrusions 340A.

In the example in FIGS. 3A-C, the position of the second and fourth toggle latch components 52 and 54 along the second and fourth lateral sides 202, 204 (and of the positioning notches 220A and protrusions 240A) is compatible with the position of the toggle latch components 51-54 (and of the position of the relevant notches and protrusions) along the lateral sides 101-104 of the pallet module 10 or of the toggle latch components 52, 54 along the lateral sides 302, 304 of the pallet module 30. In other words, two pallet modules 10 or one pallet module 30 could be assembled to either one or both of the second and fourth lateral sides 202, 204 of the pallet module 20.

By contrast, the position of the first and third toggle latch components 51 and 53 along the first and third lateral sides 201, 203 (and of the positioning notches 210A and protrusions 230A) is different, meaning that the pallet module 20 can only be coupled via the first lateral side 201 or the third lateral side 203 to a corresponding lateral side of another pallet module 20 or to a similar pallet module exhibiting the same configuration.

The pallet module 20 could however be designed to ensure that all toggle latch components 51-54, positioning notches 210A, 220A and protrusions 230A, 240A are positioned in a symmetric manner and ensure compatibility of engagement on all sides with the other pallet modules.

As far as the toggle latch components 51-54 are concerned, these are identical to the toggle latch components 51-54 used in the first embodiment. In other words, the first and second toggle latch components 51, 52 shown in FIGS. 3A-C and 4A-C are likewise spring-loaded latch elements comprising a moveable latch section 510 (linked to a handle section 520) that extends outwardly beyond the peripheral border 200A, resp. 300A, of the main structural body 200, resp. 300, while the third and fourth toggle latch components 53, 54 are catch elements comprising a catch section 550 configured to cooperate with the moveable latch section 510 of the spring-loaded latch elements of another similar pallet module.

Other than that, substantially the same considerations as set forth in respect of the first embodiment of FIGS. 1A-H apply to the pallet modules 20 and 30.

For instance, longitudinal rod elements 261, 262, resp. 361, 362, acting as reinforcing elements are likewise provided within the main structural body 200, resp. 300, and within the first and second lateral flanges 210, 220, resp. 310, 320.

In the same way, the foot structure 90 of pallet modules 20 and 30 can be strictly identical to the foot structure 90 discussed in relation to the first embodiment and FIGS. 2A-C, meaning that the releasable foot elements 91 are perfectly interchangeable between the pallet modules 10, 20 and 30.

It will therefore be appreciated that the present invention provides for unprecedented flexibility in that a large variety and sizes of pallet assemblies can be created to meet various requirements. Furthermore, this modularity is not made to the detriment of the ease and speed of assembly and disassembly, or of the robustness. This extensive modularity furthermore facilitates shipment of the relevant pallet modules and components, optimizes space usage, and increases transport efficiency as a result. The advantages of the invention are multiple and include in particular:

multiple pallet module sizes, which reduces material waste and leads to a more efficient solution for shipment purposes as multiple pallet assemblies of varying sizes can be built as a result, which pallet assemblies best fit the transport purpose and especially allow to reduce wasted space between palleted goods or equipment;

improved stackability of the pallet modules when empty/unused, which optimizes shipment as well as warehousing of individual pallet modules;

ease and speed of assembly and disassembly of the pallet modules;

optimized height of the pallet modules, which allows for a further reduction of the volume when shipping or warehousing individual pallet modules;

and high robustness and reliability, which leads to an increased life cycle and the ability to reuse the pallet modules for multiple transport operations.

Figure 10A:
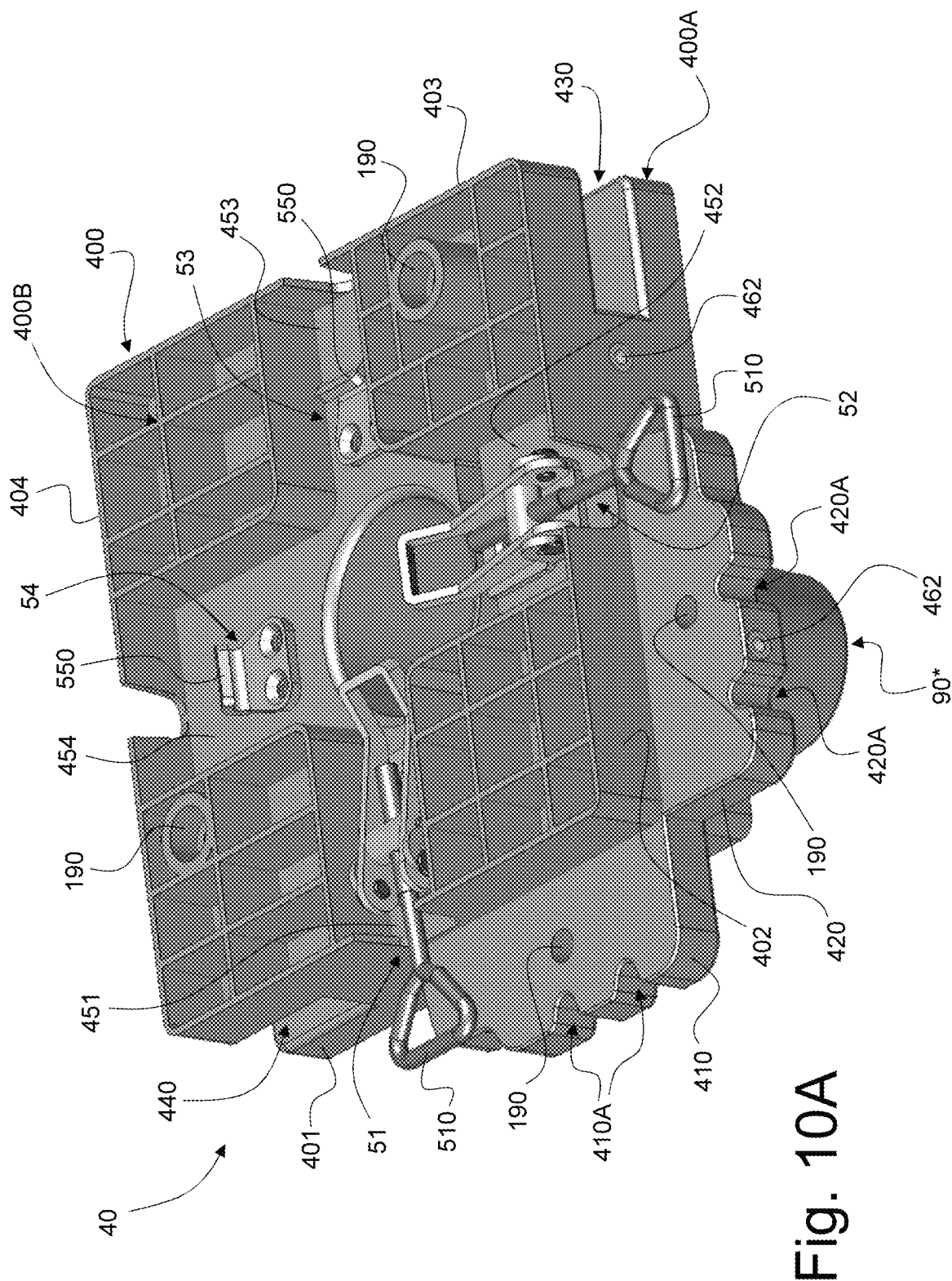
FIG. 10A is a perspective view of a pallet module, seen from an upper angle, in accordance with another embodiment of the present invention.
Figure 10B:
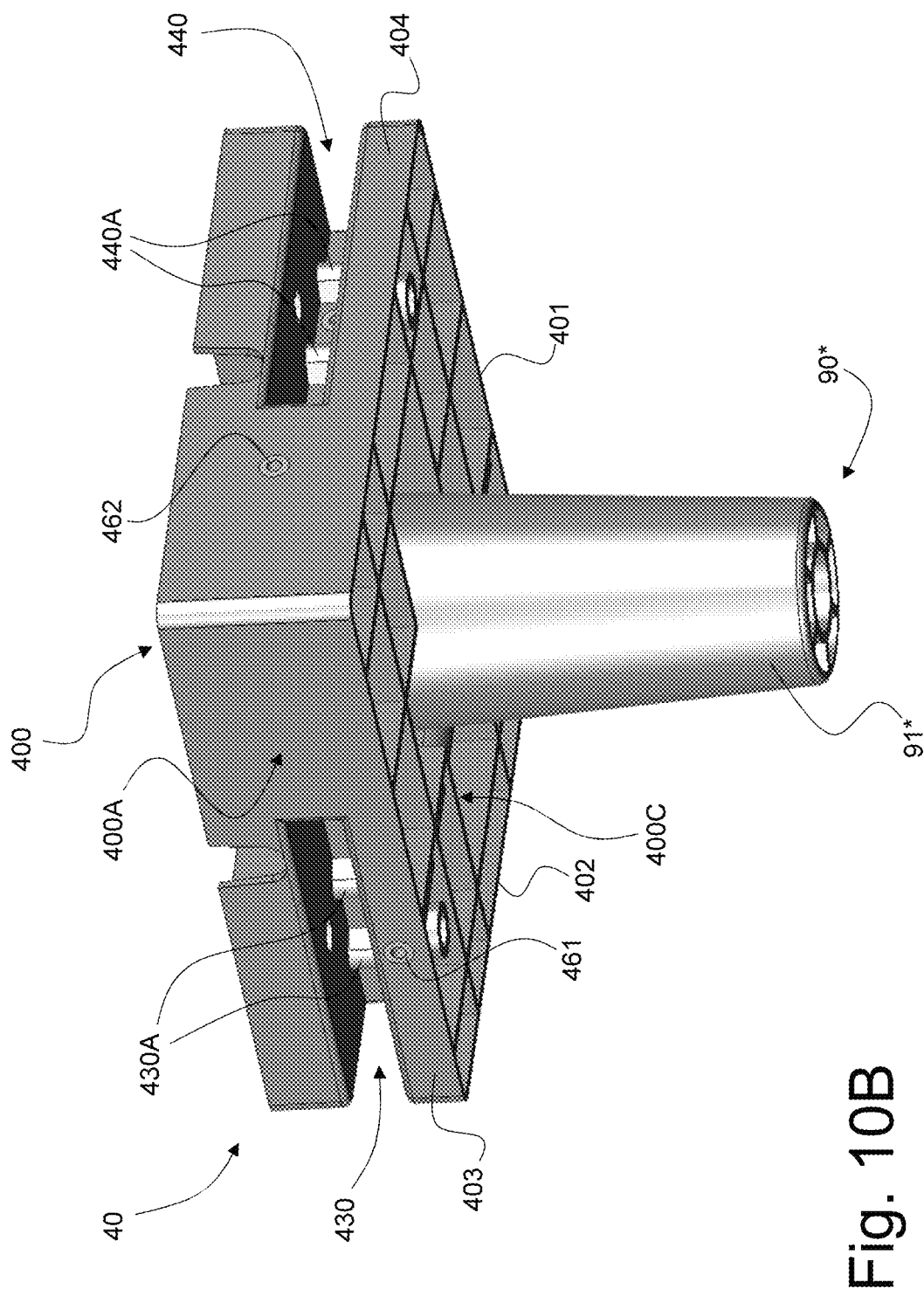
FIG. 10B is a perspective view of the pallet module of FIG. 10A seen from a lower angle.

FIGS. 10A-B are two perspective views, taken from different viewing angles, of a pallet module, designated globally by reference numeral 40, in accordance with another embodiment of the invention, and which forms part of another assortment of pallet modules. The pallet module 40 will, like the pallet module 10 of FIGS. 1A-H, be referred as a "unit-size pallet module".

The pallet module 40 shares a substantial number of common features with the pallet modules 10, 20 and 30, including:

a main structural body 400 exhibiting a generally quadrilateral peripheral border 400A with first to fourth lateral sides 401-404 extending between upper and lower sides 400B, 400C of the main structural body 400;

first and second lateral flanges 410, 420 extending outwardly from the peripheral border 400A of the main structural body 400 along the first and second lateral sides 401, 402;

first and second lateral grooves 430, 440 extending inwardly from the peripheral border 400A of the main structural body 400 along the third and fourth lateral sides 403, 404;

a foot structure 90* disposed on the lower side 400C of the main structural body 400;

first and second toggle latch components 51, 52 arranged in the vicinity of the first and second lateral sides 401, 402; and third and fourth toggle latch components 53, 54 arranged in the vicinity of the third and fourth lateral sides 403, 404.

In a manner similar to the unit-size pallet module 10, the main structural body 400 of the unit-size pallet module 40 preferably exhibits a square shape, and all larger-size pallet modules of the same assortment (not shown) exhibit similar configurations allowing pallet modules to be combinable with one another. By way of illustration, the unit length (L1) of the unit-size pallet module 40 is here of approximately 192 mm.

The first to fourth toggle latch components 51-54 are likewise provided on the upper side 400B of the main structural body 400, at least partly within corresponding recesses 451-454 formed below the upper surface of the upper side 400B of the main structural body 400.

One difference between the pallet module 40 of FIGS. 10A-B and the pallet modules 10, 20, 30 of FIGS. 1A-H, 3A-C and 4A-C resides in the configuration of the first and second lateral flanges 410, 420 and first and second lateral grooves 430, 440, which only extend along a portion of the relevant lateral sides 401-404. It may furthermore be appreciated that each lateral flange 410, 420 is provided with a pair of positioning notches 410A, resp. 420A, and that each lateral groove 430, 440 is likewise provided with a pair of protrusions 430A, 440A, the function of which remains the same as previously described.

One further difference resides in the configuration of the foot structure 90*, which consists in this example of a fixed foot structure provided on the lower side 400C of the main structural body 400 and comprising a foot element 91* that is made integral with the main structural body 400. Advantageously, the foot element 91* exhibits a conical shape, as shown, and the main structural body 400 is structured to exhibit a corresponding depression on the upper side 400B allowing stacking of multiple pallet modules 40 one on top of the other, which reduces space consumption when stacked.

The aforementioned pallet module structures and sizes are illustrative of possible embodiments of the invention. In accordance with another embodiment of the invention, one could contemplate that the main structural body of each of the larger-size pallet modules has a size corresponding to an integer multiple of the unit size of the unit-size pallet module.

In particular, the unit-size pallet module could exhibit a square shape of dimensions L1×L1 (like the pallet module 10 of FIGS. 1A-H or the pallet module 40 of FIGS. 10A-B) and the peripheral border of the main structural body of each one of the larger-size pallet modules could exhibit a square shape of dimensions n*L1×n*L1, where n is an integer greater than or equal to 2. Even more preferably, the larger-size pallet modules could exhibit a square shape of dimension $2^{n*}L1 \times 2^{n*}L1$. FIGS. 11A-B to 13A-B are illustrative of an assortment of pallet modules following this principle. In this context, optimal sizes include especially sizes deriving from a unit length L1 ranging from 150 mm to 300 mm, and in particular a unit length of 180-192 mm, 239-256 mm or 272-288 mm, which constitute particularly preferred dimensions. The same principle could however be applied in the event that the unit-size pallet module exhibits a rectangular shape with different dimensions in length and width, the consequence being that each larger-size pallet module of the assortment will likewise exhibit a rectangular shape whose size is an integer multiple of the unit size of the unit-size pallet module.

Figure 11A:
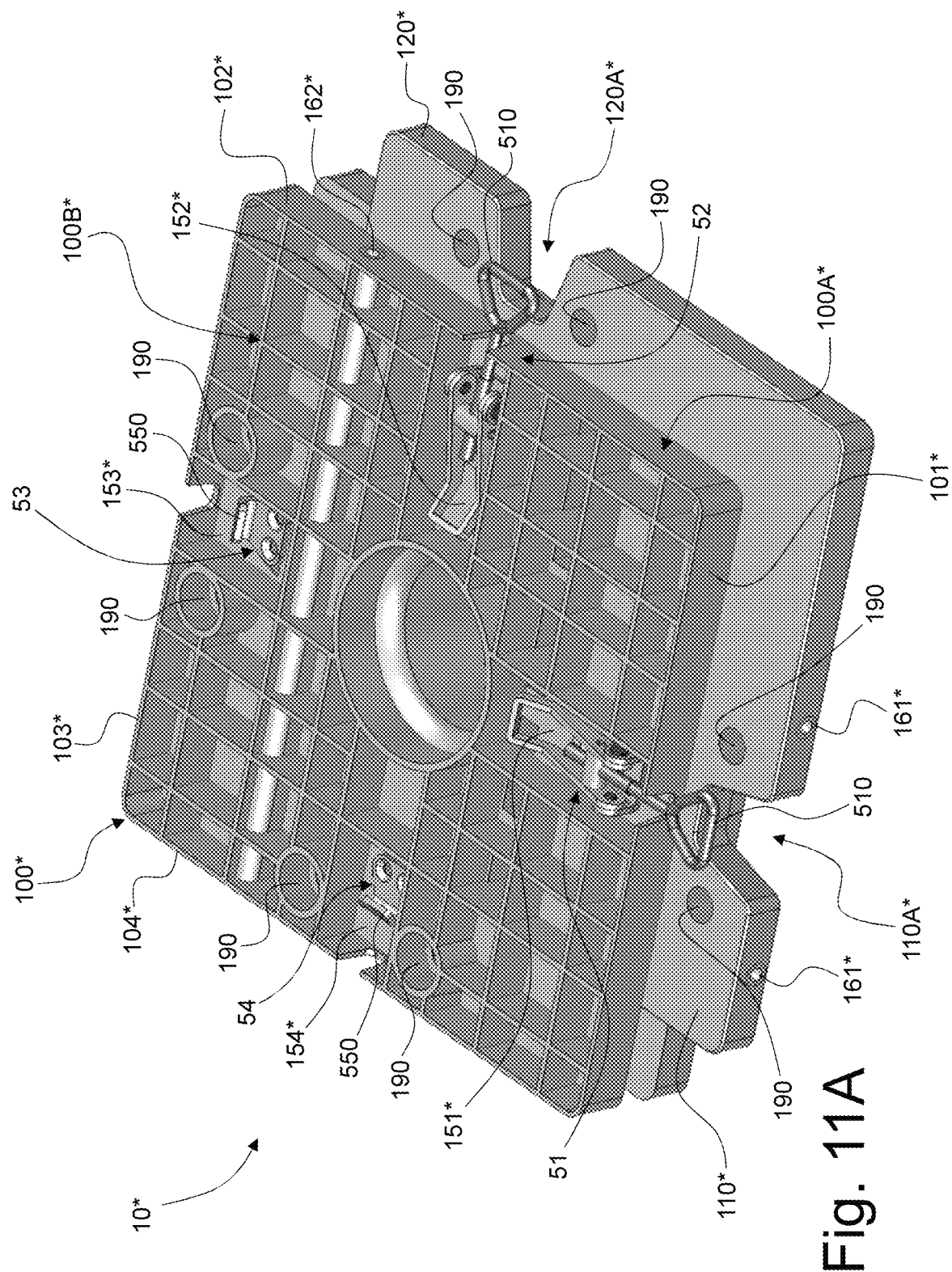
FIG. 11A is a perspective view of a pallet module, seen from an upper angle, in accordance with yet another embodiment of the present invention.
Figure 11B:
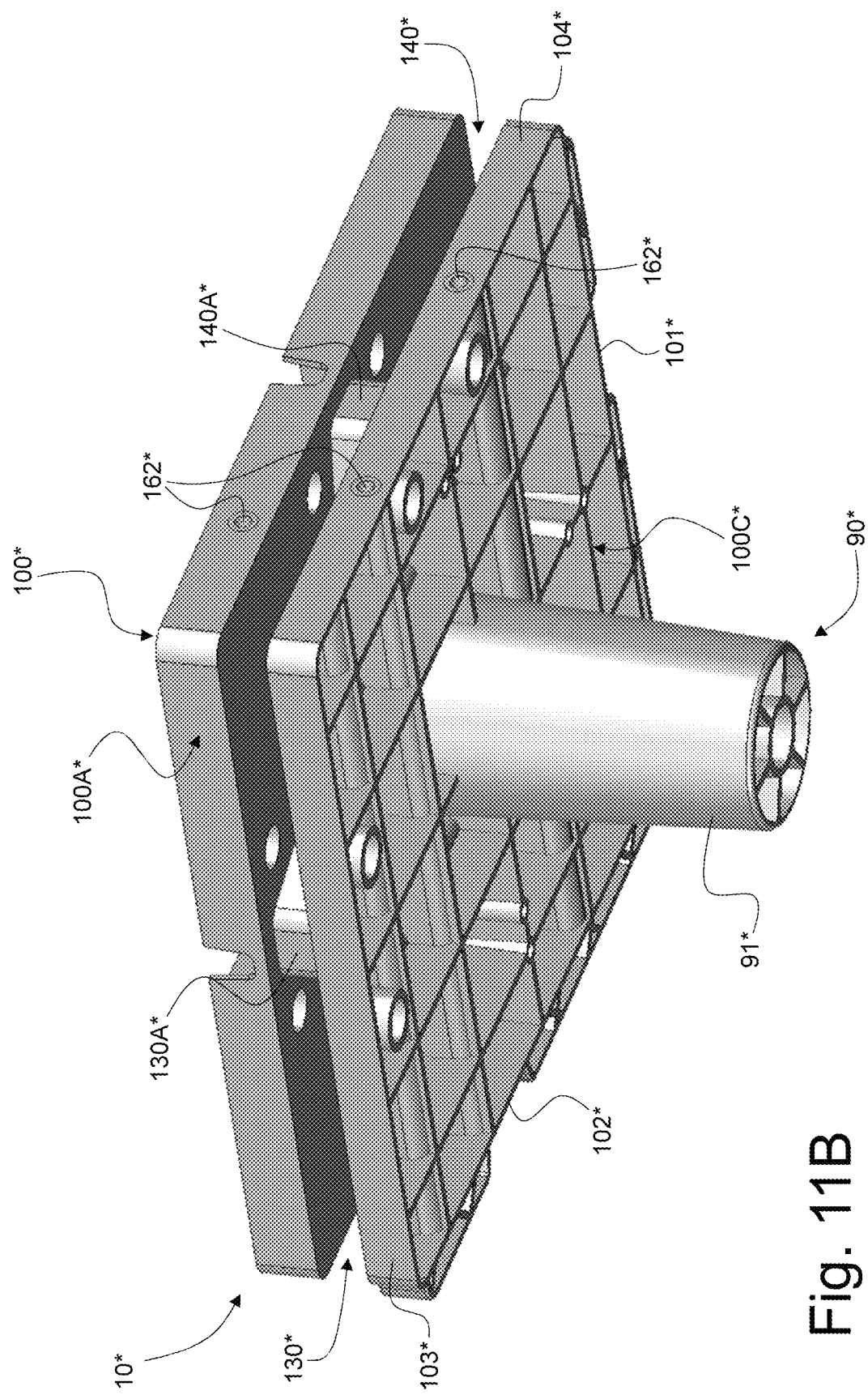
FIG. 11B is a perspective view of the pallet module of FIG. 11B seen from a lower angle.

FIGS. 11A-B are two perspective views, taken from different viewing angles, of a pallet module, designated globally by reference numeral 10*, in accordance with yet another embodiment of the invention, and which forms part of a further assortment of pallet modules. The pallet module 10* will, like the pallet module 10 of FIGS. 1A-H and the pallet module 40 of FIGS. 10A-B, be referred as a "unit-size pallet module".

Figure 12A:
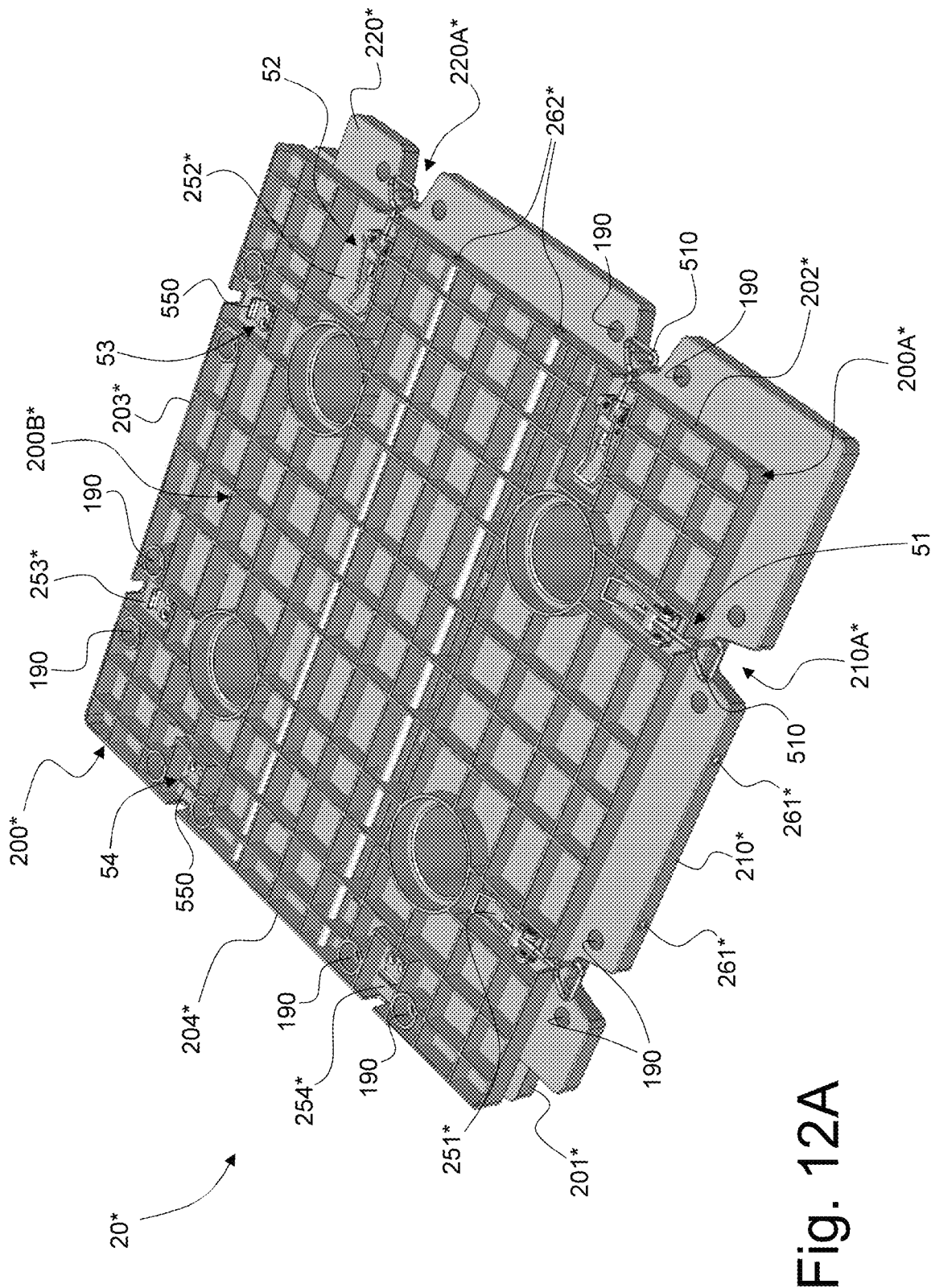
FIG. 12A is a perspective view of a pallet module, seen from an upper angle, in accordance with a further embodiment of the present invention, which pallet module forms part of the same assortment of pallet modules as the pallet module of FIGS. 11A-B.
Figure 12B:
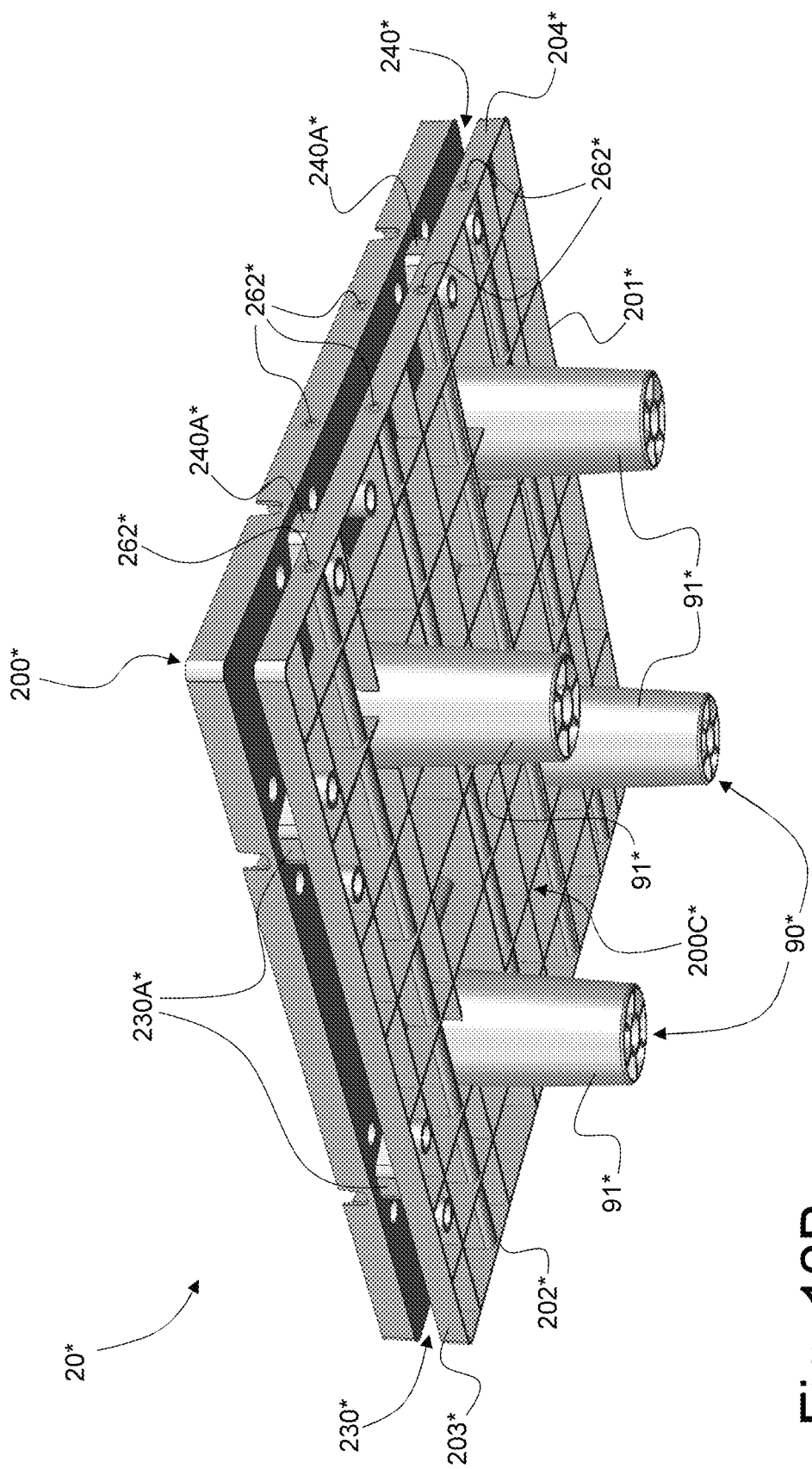
FIG. 12B is a perspective view of the pallet module of FIG. 12A seen from a lower angle.

FIGS. 12A-B are two perspective views, taken from different viewing angles, of a pallet module, designated globally by reference numeral 20*, in accordance with an embodiment of the invention, and which forms part of the same assortment of pallet modules as the pallet module 10* of FIGS. 11A-B. The pallet module 20* will also be referred as a "medium-size pallet module".

Figure 13A:
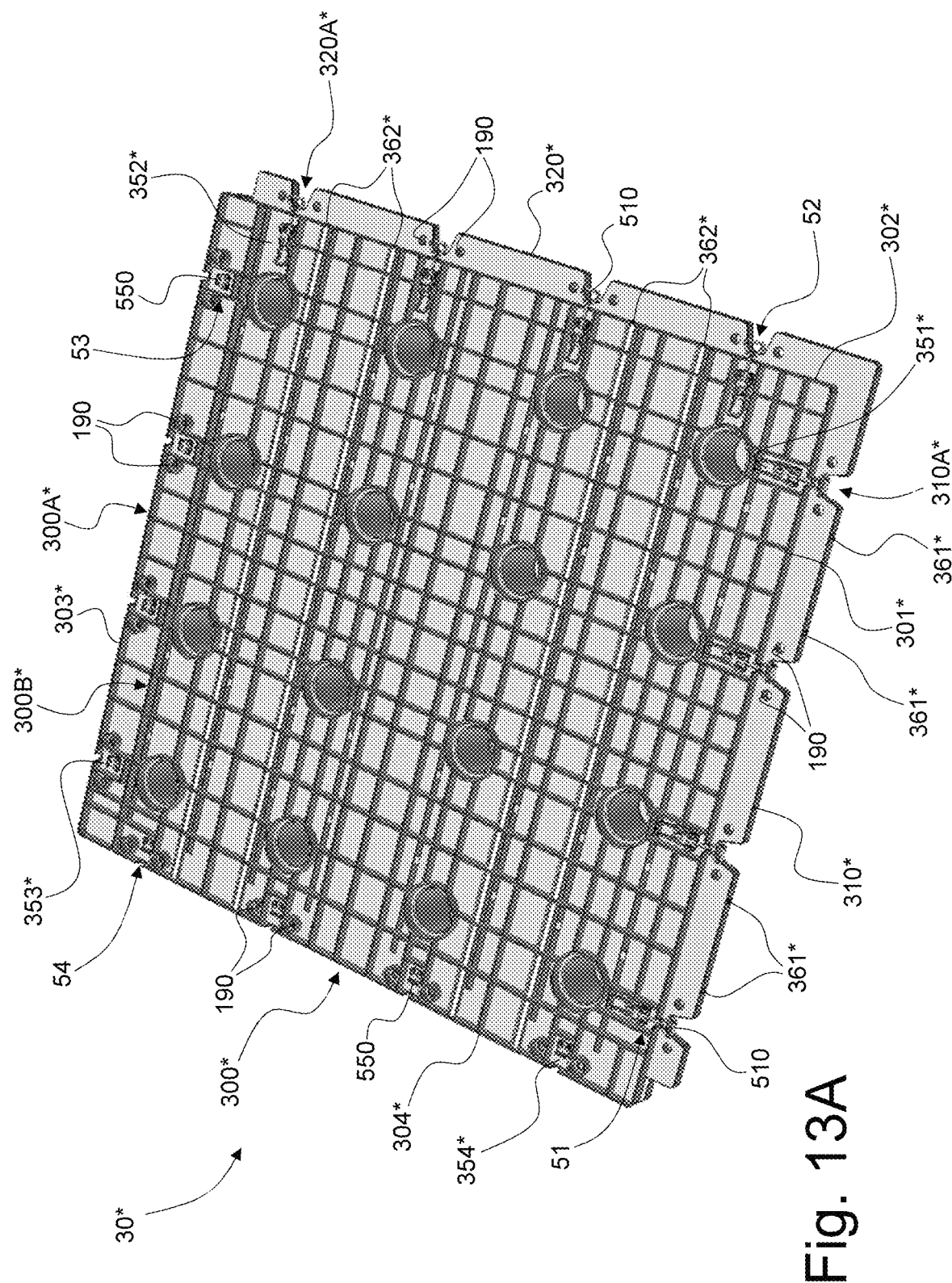
FIG. 13A is a perspective view of a pallet module, seen from an upper angle, in accordance with still another embodiment of the present invention, which pallet module forms part of the same assortment of pallet modules as the pallet modules of FIGS. 11A-B and FIGS. 12A-B.
Figure 13B:
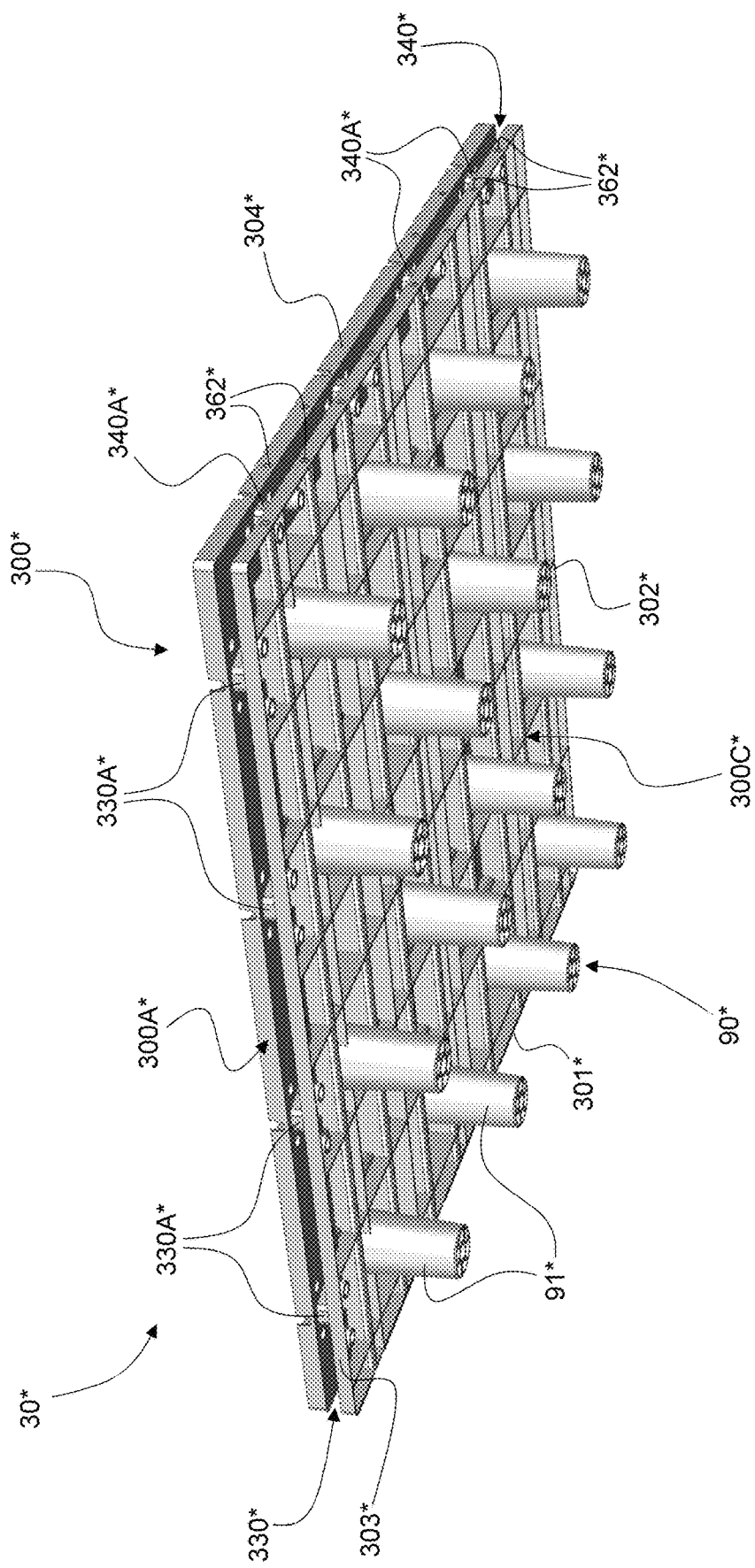
FIG. 13B is a perspective view of the pallet module of FIG. 13A seen from a lower angle.

FIGS. 13A-B are two perspective views, taken from different viewing angles, of a pallet module, designated globally by reference numeral 30*, in accordance with an embodiment of the invention, and which likewise forms part of the same assortment of pallet modules as the pallet module 10* of FIGS. 11A-B and the pallet module 20* of FIGS. 12A-B. The pallet module 30* will also be referred as a "large-size pallet module".

The pallet modules 10*, 20* and 30* share a substantial number of common features, including:

a main structural body 100*, 200*, resp. 300*, exhibiting a generally quadrilateral peripheral border 100A*, 200A*, resp. 300A* with first to fourth lateral sides 101*-104*, 201*-204*, resp. 301*-304*, extending between upper and lower sides 100B*, 100C*, 200B*, 200C*, resp. 300B*, 300C*, of the main structural body 100*, 200*, resp. 300*;

first and second lateral flanges 110*, 120*, 210*, 220*, resp. 310*, 320*, extending outwardly from the peripheral border 100A*, 200A*, resp. 300A*, of the main structural body 100*, 200*, resp. 300*, along the first and second lateral sides 101*, 102*, 201*, 202*, resp. 301*, 302*;

first and second lateral grooves 130*, 140*, 230*, 240*, resp. 330*, 340*, extending inwardly from the peripheral border 100A*, 200A*, resp. 300A*, of the main structural body 100*, 200*, resp. 300*, along the third and fourth lateral sides 103*, 104*, 203*, 204*, resp. 303*, 304*;

a foot structure 90* disposed on the lower side 100C*, 200C*, resp. 300C*, of the main structural body 100*, 200*, resp. 300*;

first and second toggle latch components 51, 52 arranged in the vicinity of the first and second lateral sides 101*, 102*, 201*, 202*, resp. 301*, 302*; and third and fourth toggle latch components 53, 54 arranged in the vicinity of the third and fourth lateral sides 103*, 104*, 203*, 204*, resp. 303*, 304*.

The first to fourth toggle latch components 51-54 are likewise provided on the upper side 100B*, 200B*, resp. 300B*, of the main structural body 100*, 200*, resp. 300*, at least partly within corresponding recesses 151*-154*, 251*-254*, resp. 351*-354*, formed below the upper surface of the upper side 100B*, 200B*, resp. 300B*, of the main structural body 100*, 200*, resp. 300*.

The main structural bodies 100*, 200*, 300* of the unit-size pallet module 10*, the medium-size pallet module 20* and the large-size pallet module 30*, respectively, each exhibit a square shape. The length of the main structural body 200* of the medium-size pallet module 20* is here twice the unit length (L1), while the length of the main structural body 300* of the large-size pallet module 30* is four times the unit length (L1). By way of illustration, the unit length (L1) of the unit-size pallet module 10* is of approximately 287.5 mm, meaning that the length of the medium-size pallet module 20* and of the large-size pallet module 30* is of 575 mm and 1,150 mm, respectively. Other dimensions could once again be contemplated, without departing from the scope of the invention as claimed. The number of toggle latch components 51-54 along each side increases as a function of the increase in dimensions of the pallet module, namely from one per side for the unit-size pallet module 10*, to two per side for the medium-size pallet module 20*, and four per side for the large-size pallet module 30*.

In a manner similar to pallet module 40 of FIGS. 10A-B, the foot structure 90* consists in each case of a fixed foot structure comprising one or more foot elements 91* that are made integral with the main structural body 100*, 200*, resp. 300*. Advantageously, the main structural bodies 100*, 200*, resp. 300* are likewise structured to exhibit one or more corresponding depressions on the upper side 100B*, 200B*, resp. 300B* allowing stacking of multiple pallet modules one on top of the other.

In accordance with another variant of the invention, which is reflected on all illustrated embodiments shown in FIGS. 1A-H, 3A-C, 4A-C, 10A-B, 11A-B, 12A-B and 13A-B, through-holes 190 could be provided in the main structural body 100, 200, 300, 400, 100*, 200* resp. 300* and the first and second lateral flanges 110, 120, 210, 220, 310, 320, 410, 420, 110*, 120*, 210*, 220* resp. 310*, 320*, next to the toggle latch components 51-54, which through-holes 190 extend from an upper surface to a lower surface of the main structural body and the first and second lateral flanges. FIGS. 1A-H, 3A-C, 4A-C, 11A-B, 12A-B and 13A-B actually show the provision of a pair of such through-holes 190 next to each of the toggle latch components 51-54, while FIGS. 10A-B show only one such through-hole 190 next to each of toggle latch component 51-54. These through-holes 190 are advantageous in that they can be exploited for the purpose of passing ropes, straps or like securing bands to secure a load on the relevant pallet assembly. These through-holes 190 can furthermore be used to mount vertical posts on the pallet assembly to support e.g. side walls or barriers.

FIGS. 5A-B to 7A-B illustrate a further refinement of the invention shown in the particular context of the pallet module 10, but that is applicable by analogy to any other pallet module, including the pallet modules 20 and 30 of FIGS. 3A-C and 4A-C, the pallet module 40 of FIGS. 10A-B, and the pallet modules 10*, 20* and 30* of FIGS. 11A-B to 13A-B.

Figure 5A:
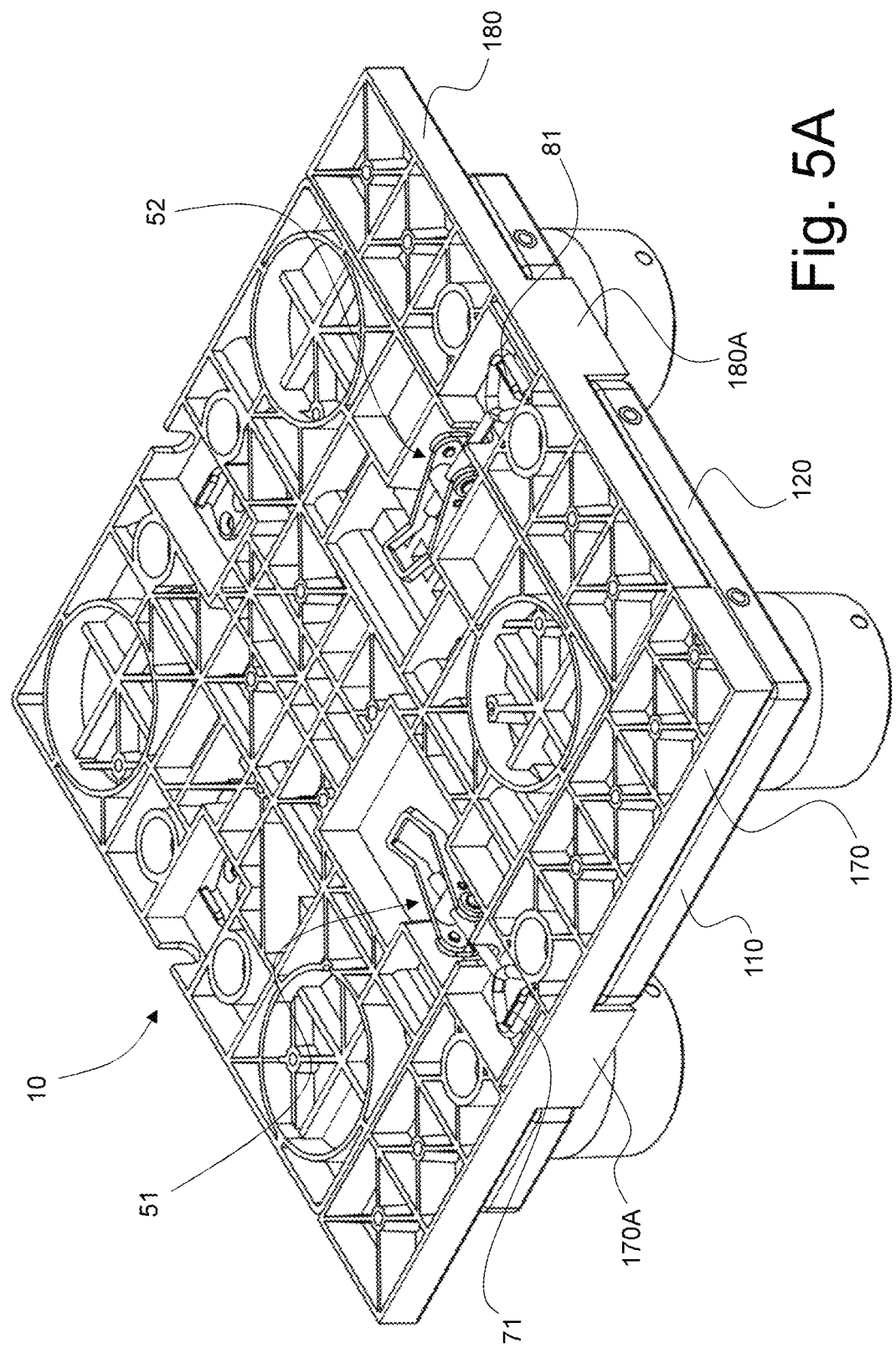
FIG. 5A is a perspective view of the pallet module of FIG. 1A, seen from an upper angle, which pallet module is further provided with a pair of cover elements in accordance with a further embodiment of the invention.
Figure 5B:
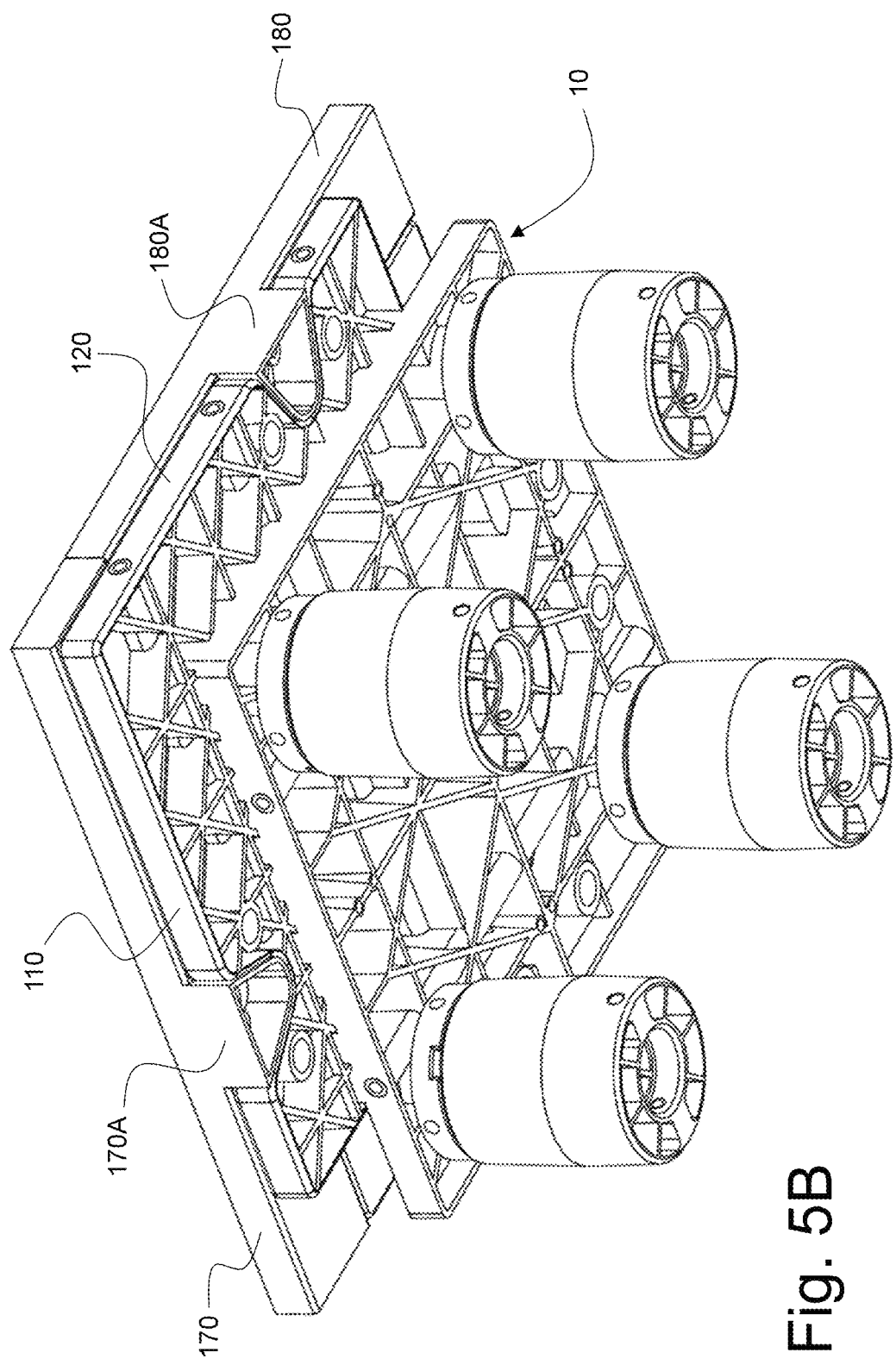
FIG. 5B is a perspective view of the pallet module and cover elements of FIG. 5A seen from a lower angle.
Figure 6A:
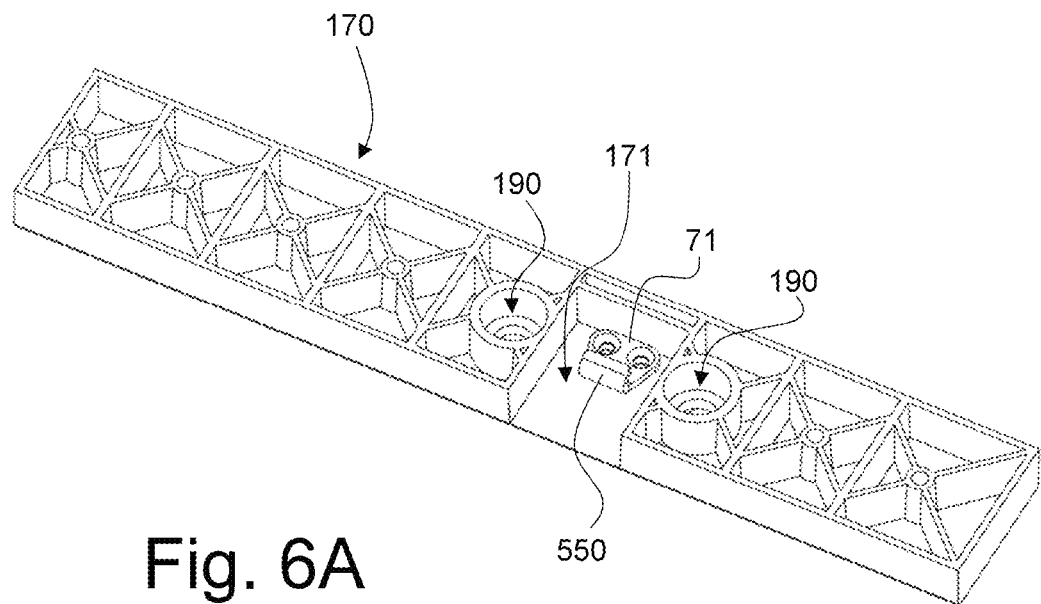
FIGS. 6A and 6B are perspective views of a first one of the cover elements of FIGS. 5A-5B seen from upper and lower angles.
Figure 6B:
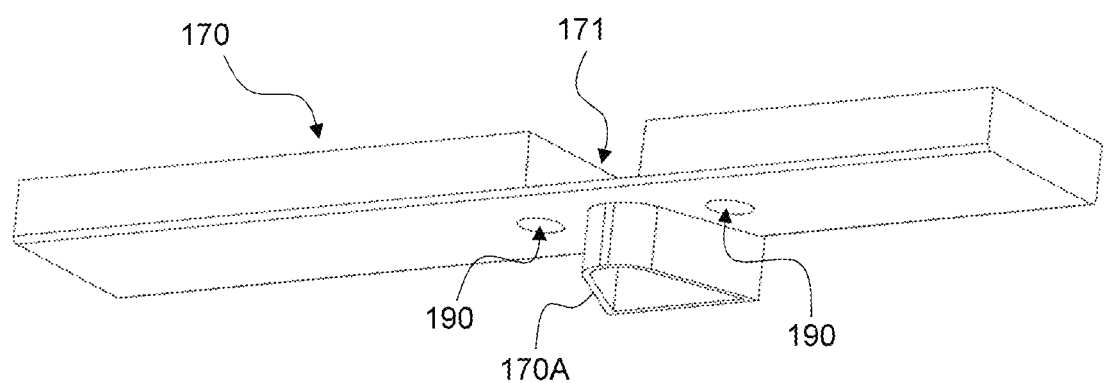
Figure 7A:
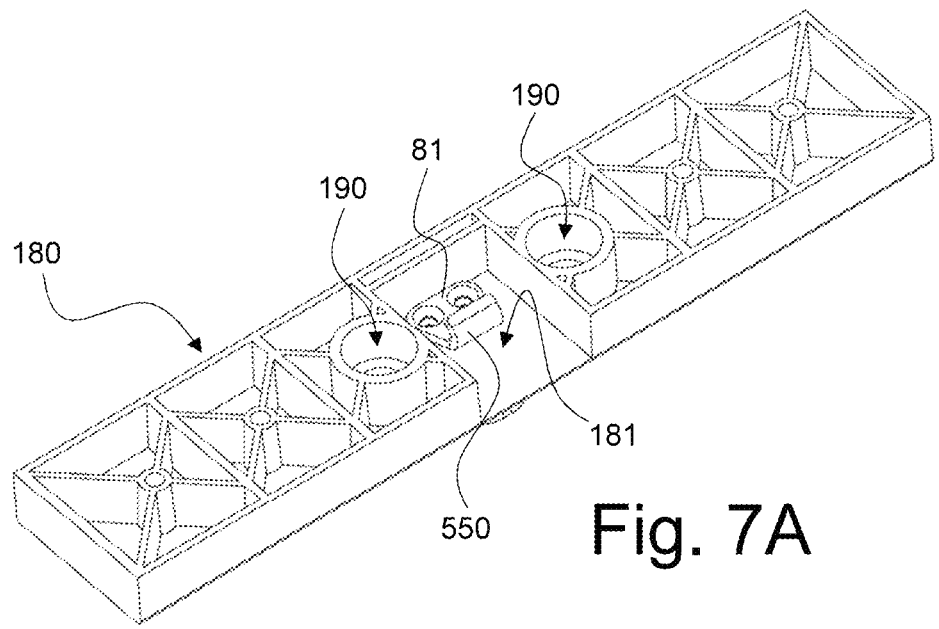
FIGS. 7A and 7B are perspective views of the second one of the cover elements of FIGS. 5A-5B seen from upper and lower angles.
Figure 7B:
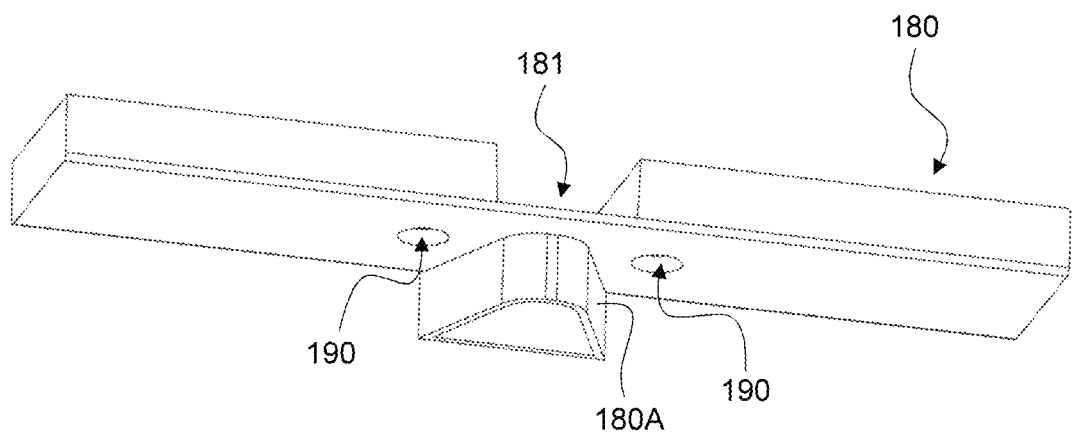

FIGS. 5A-B show the pallet module 10 of FIGS. 1A-H additionally provided with a pair of cover elements 170, 180 configured to cover an upper side of the first and second lateral flanges 110, 120, each cover element 170, 180 having an upper surface that is flush with an upper surface of the upper side 100B of the main structural body 100 of the pallet module 10. Each cover element 170, 180 is separately shown in FIGS. 6A-B and 7A-B, respectively.

While two cover elements 170, 180 are shown in FIGS. 5A-B, one could obviously contemplate to use a single L-shaped cover element to cover both the first and second lateral flanges 110, 120.

Figure 9A:
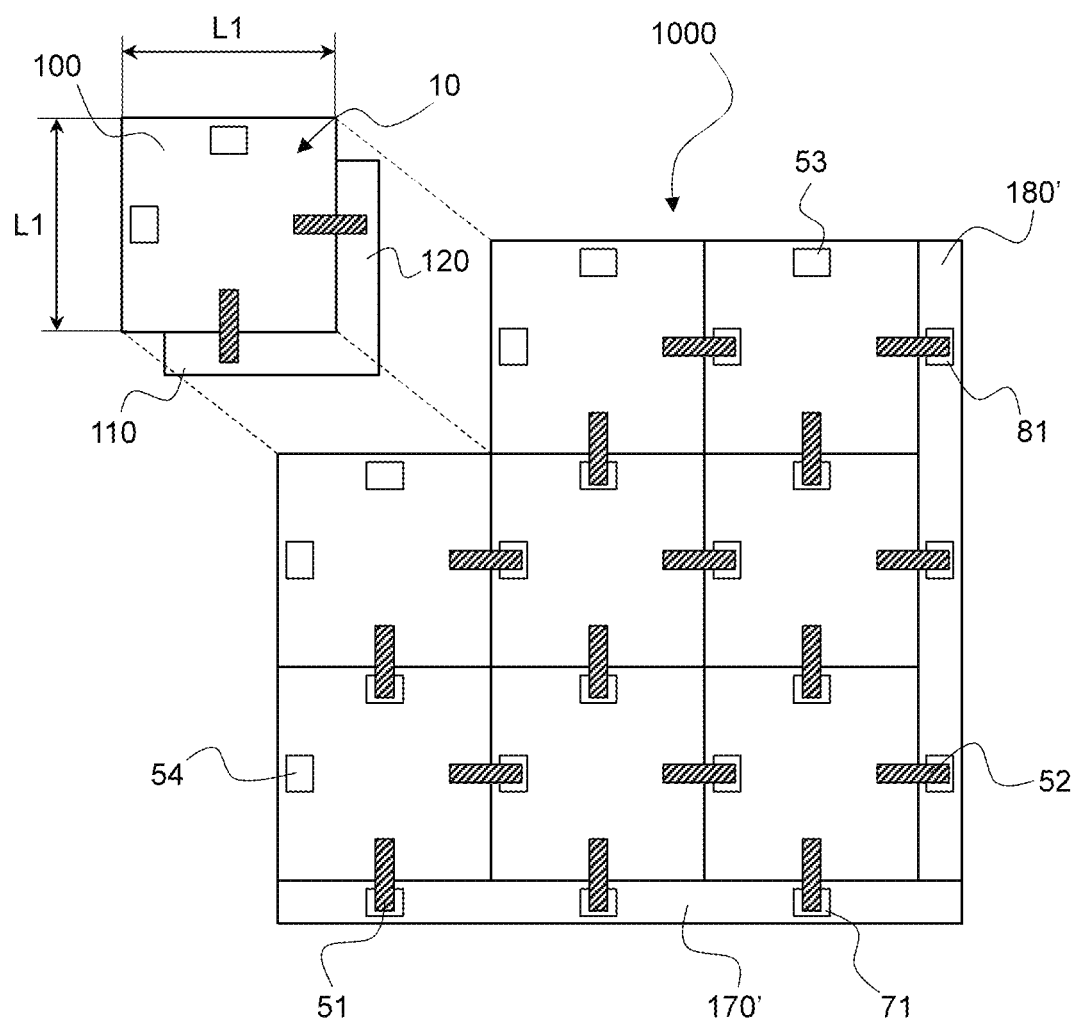
FIG. 9A is a schematic top view of a pallet assembly formed by combining multiple pallet modules in accordance with the first embodiment of the present invention.
Figure 9B:
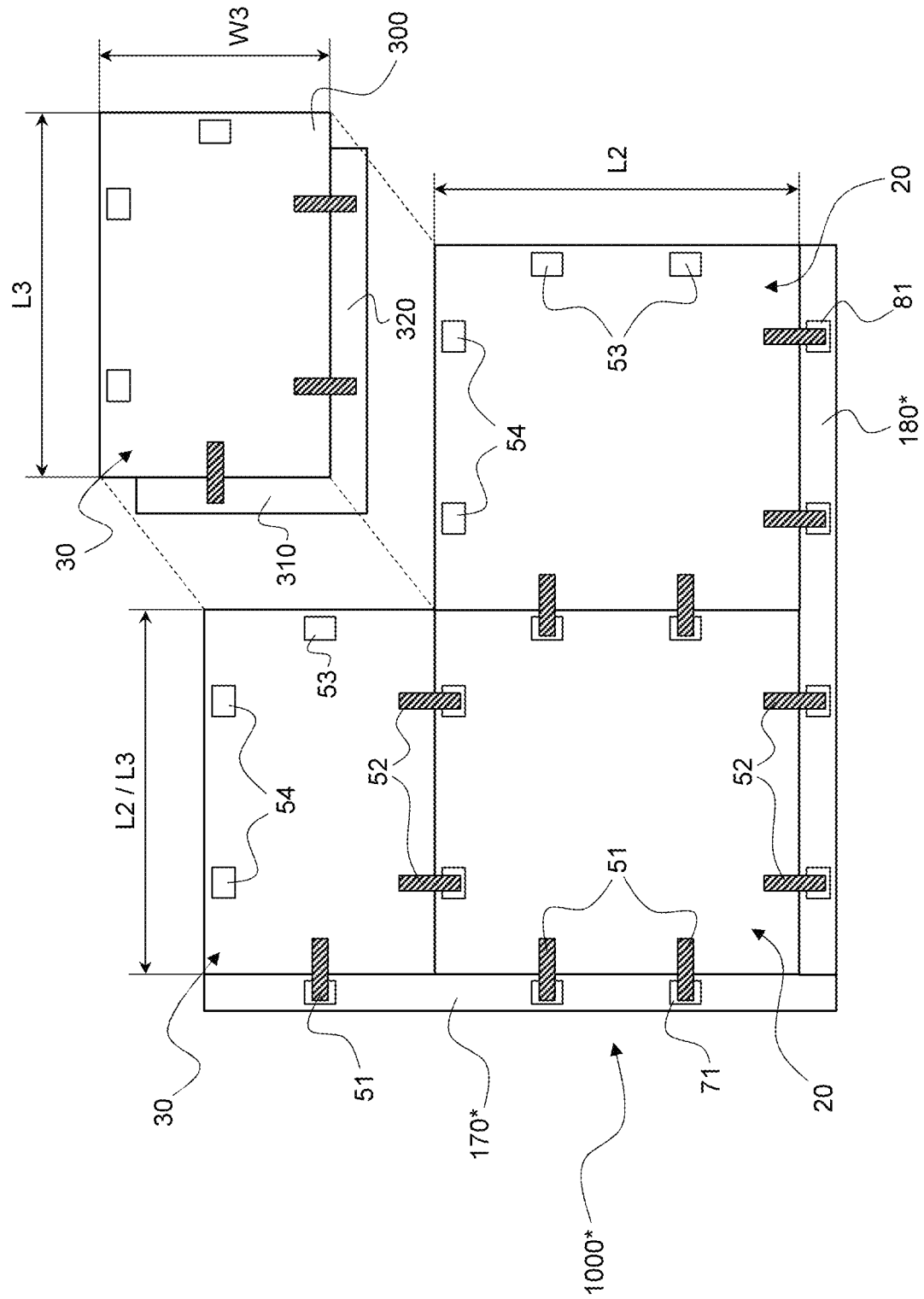
FIG. 9B is another schematic top view of a pallet assembly formed by combining multiple pallet modules in accordance with the second and third embodiments of the present invention.

It shall also be appreciated that each cover element may also cover part of the first or second lateral flanges of another pallet module of the nested pallet assembly as for instance disclosed by way of illustration in FIGS. 9A and 9B.

Irrespective of the above, each cover element comprises at least one toggle latch component 71, resp. 81, configured to cooperate and interlock with a corresponding one of the first and second latch components 51, 52 of the pallet module 10 to form a releasable toggle latch 500 allowing the cover element to be secured to or released from the pallet module 10. In the illustrated example, each toggle latch component 71, 81 consists of a catch element comprising a catch section 550, identical to that of the third and fourth toggle latch components 53, 54, which catch element is located within a corresponding recess 171, resp. 181, of the cover element.

Also visible in FIGS. 5A-B to 7A-B is an extension 170A, resp. 180A, provided on the underside of each cover element 170, 180 to fill the gap of the positioning notches 110A, 120A formed along the outer edge of the first and second lateral flanges 110, 120.

FIGS. 9A and 9B are two schematic top views of a pallet assembly formed by combining multiple pallet modules in accordance with the present invention.

More precisely, FIG. 9A shows a pallet assembly 1000 formed of nine unit-size pallet modules 10 that are assembled together to form a square-shaped pallet assembly. In this illustrative example, two cover elements 170' and 180' are located on the portions of the pallet assembly 1000 where the first and second lateral flanges 110, 120 of pallet modules 10 would otherwise be exposed.

FIG. 9B shows another pallet assembly 1000* formed of four pallet modules, namely two large-size pallet modules 20 and two medium-size pallet modules 30. In a manner similar to the pallet assembly 1000 of FIG. 9A, two cover elements 170* and 180* are located on the portions of the pallet assembly 1000* where the first and second lateral flanges 210, 220, 310, 320 of pallet modules 20, 30 would otherwise be exposed.

In accordance with an embodiment of the invention, the unit size of the unit-size pallet module (including the unit-size pallet module 10, 40 or 10* described above) can be selected such that a total width of a pallet assembly, equaling to an integer number of times the width (or length) L1 of the unit-size pallet module, fits within a width of a door opening of a standard rail/sea shipping container and can occupy more than 95% (preferably more than 98%) of the width of this door opening. The relevant width of the door opening of a standard rail/sea shipping container may in particular be of approximately 2.33 meters (or 92 inches). In this context, the aforementioned requirements would for instance be met with a pallet assembly having a total width equaling to eight times the width L1 of a unit-size pallet module having a unit size of approximately 290 mm×290 mm.

Similarly, in accordance with another embodiment of the invention, the unit size of the unit-size pallet module can be selected such that a total width of a pallet assembly, equaling to an integer number of times the width (or length) L1 of the unit-size pallet module, fits within a width of a door opening of a standard truck shipping container and can occupy more than 95% (preferably more than 98%) of the width of this door opening. The relevant width of the door opening of a standard truck shipping container may in particular be of approximately 2.5 meters (or 98 inches). In this context, the aforementioned requirements would for instance be met with a pallet assembly having a total width equaling to twelve times the width L1 of a unit-size pallet module having a unit size of approximately 206 mm×206 mm.

In accordance with a particularly preferred application of the present invention, the pallet modules may advantageously be configured to be compatible with and enable the so-called Physical Internet (PI) global logistics model, which is also referred to as the Physical Internet Initiative (see in particular "Towards a Physical Internet: Meeting the Global Logistics Sustainability Grand Challenge", Benoit Montreuil, January 2011, CIRRELT-2011-03, which publication is incorporated herein by reference in its entirety). The Physical Internet encapsulates physical objects in physical packets or containers (referred to as "TT-containers"). The modularity of the pallet concept of the present invention is in effect a functional enabler of this encapsulation principle. "Encapsulation" is one of the three main requirements of the Physical Internet global logistics model; two additional requirements are "Protocols" and "Interfaces". The present invention further acts as an enabler to the implementation of these two additional requirements in that it allows for the standardization of pallet modules for different sizes and load requirements, and provides for added flexibility, enabling reorganization of the entire freight logistics at distribution centres (or nodes). In this context, each pallet module may further include a smart tag (based e.g. on RFID or GPS technology) providing identification and traceability of each pallet module, a further functional enabler of the Physical Internet global logistics model. This smart tag in particular helps ensuring the identification, integrity, routing, conditioning, monitoring, traceability and security of each TT-container and further enables distributed handling, storage and routing automation.

Various modifications and/or improvements may be made to the above-described embodiments without departing from the scope of the invention as defined by the appended claims. For instance, while the illustrated embodiments show pallet modules where the first and second flanges and the first and second lateral grooves are contiguous, the first and second lateral flanges and the first and second lateral grooves could alternatively be provided on opposite lateral sides of the main structural body of the pallet module. In that respect, the expressions "first lateral side", "second lateral side", "third lateral side" and "fourth lateral side" shall not be construed as designating any particular sequence of sides, but rather any of the four lateral sides forming the quadrilateral peripheral border of the main structural body of the pallet module.

In addition, it will be understood that each pallet module may comprise a multiplicity of lateral flanges arranged in different levels and a corresponding multiplicity of lateral grooves configured to mate with the multiplicity of a lateral flanges of another similar pallet module.

Furthermore, as already mentioned hereabove, the foot structure could be designed as a releasable foot structure or as a fixed foot structure comprising one or more fixed foot elements that are made integral with the main structural body of the pallet module or that are permanently attached to the main structural body.

It is also to be appreciated that the invention is not limited to assortments of pallet modules including only a unit-size pallet module, a medium-size pallet module and a large-size pallet module.

Moreover, the peripheral border of the main structural body of the unit-size pallet module does not necessarily need to exhibit a square shape but could for instance be of rectangular shape with different dimensions in width and length. The invention is in effect applicable to any pallet module whose main structural body exhibits a generally quadrilateral peripheral border.

LIST OF REFERENCE NUMERALS AND SIGNS USED THEREIN 10 (unit-size) pallet module (first assortment of pallet modules)
100 main structural body of pallet module 10
100A generally quadrilateral peripheral border of main structural body 100
100B upper side of main structural body 100
100C lower side of main structural body 100
101 first lateral side of main structural body 100
102 second lateral side of main structural body 100
103 third lateral side of main structural body 100
104 fourth lateral side of main structural body 100
110 first lateral flange extending outwardly from peripheral border 100A of main structural body 100, along first lateral side 101
110A positioning notch formed along an outer edge of first lateral flange 110
120 second lateral flange extending outwardly from peripheral border 100A of main structural body 100, along second lateral side 102
120A positioning notch formed along an outer edge of second lateral flange 120
130 first lateral groove extending inwardly from peripheral border 100A of main structural body 100, along third lateral side 103
130A protrusion formed within first lateral groove 130
140 second lateral groove extending inwardly from peripheral border 100A of main structural body 100, along fourth lateral side 104
140A protrusion formed within second lateral groove 140
151 recess accommodating first toggle latch component 51
152 recess accommodating second toggle latch component 52
153 recess accommodating third toggle latch component 53
154 recess accommodating third toggle latch component 54
161 reinforcing elements extending within main structural body 100/first series of longitudinal rod elements
162 reinforcing elements extending within main structural body 100 and first and second lateral flanges 110, 120/second series of longitudinal rod elements
20 (large-size) pallet module (first assortment of pallet modules)
200 main structural body of pallet module 20
200A generally quadrilateral peripheral border of main structural body 200
200B upper side of main structural body 200
200C lower side of main structural body 200
201 first lateral side of main structural body 200
202 second lateral side of main structural body 200
203 third lateral side of main structural body 200
204 fourth lateral side of main structural body 200
210 first lateral flange extending outwardly from peripheral border 200A of main structural body 200, along first lateral side 201
210A positioning notch formed along an outer edge of first lateral flange 210
220 second lateral flange extending outwardly from peripheral border 200A of main structural body 200, along second lateral side 202
220A positioning notch formed along an outer edge of second lateral flange 220

230 first lateral groove extending inwardly from peripheral border 200A of main structural body 200, along third lateral side 203
230A protrusion formed within first lateral groove 230
240 second lateral groove extending inwardly from peripheral border 200A of main structural body 200, along fourth lateral side 204
240A protrusion formed within second lateral groove 240
251 recess accommodating first toggle latch component 51
252 recess accommodating second toggle latch component 52
253 recess accommodating third toggle latch component 53
254 recess accommodating third toggle latch component 54
261 reinforcing elements extending within main structural body 200/first series of longitudinal rod elements
262 reinforcing elements extending within main structural body 200 and first and second lateral flanges 210, 220/second series of longitudinal rod elements
30 (medium-size) pallet module (first assortment of pallet modules)
300 main structural body of pallet module 30
300A generally quadrilateral peripheral border of main structural body 300
300B upper side of main structural body 300
300C lower side of main structural body 300
301 first lateral side of main structural body 300
302 second lateral side of main structural body 300
303 third lateral side of main structural body 300
304 fourth lateral side of main structural body 300
310 first lateral flange extending outwardly from peripheral border 300A of main structural body 300, along first lateral side 301
310A positioning notch formed along an outer edge of first lateral flange 310
320 second lateral flange extending outwardly from peripheral border 300A of main structural body 300, along second lateral side 302
320A positioning notch formed along an outer edge of second lateral flange 320
330 first lateral groove extending inwardly from peripheral border 300A of main structural body 300, along third lateral side 303
330A protrusion formed within first lateral groove 330
340 second lateral groove extending inwardly from peripheral border 300A of main structural body 300, along fourth lateral side 304
340A protrusion formed within second lateral groove 340
351 recess accommodating first toggle latch component 51
352 recess accommodating second toggle latch component 52
353 recess accommodating third toggle latch component 53
354 recess accommodating third toggle latch component 54
361 reinforcing elements extending within main structural body 300/first series of longitudinal rod elements
362 reinforcing elements extending within main structural body 300 and first and second lateral flanges 310, 320/second series of longitudinal rod elements
40 (unit-size) pallet module (second assortment of pallet modules)
400 main structural body of pallet module 40
400A generally quadrilateral peripheral border of main structural body 400
400B upper side of main structural body 400
400C lower side of main structural body 400
401 first lateral side of main structural body 400
402 second lateral side of main structural body 400
403 third lateral side of main structural body 400
404 fourth lateral side of main structural body 400
410 first lateral flange extending outwardly from peripheral border 400A of main structural body 400, along portion of first lateral side 401
410A positioning notches formed along an outer edge of first lateral flange 410
420 second lateral flange extending outwardly from peripheral border 400A of main structural body 400, along portion of second lateral side 402
420A positioning notches formed along an outer edge of second lateral flange 420
430 first lateral groove extending inwardly from peripheral border 400A of main structural body 400, along portion of third lateral side 403
430A protrusions formed within first lateral groove 430
440 second lateral groove extending inwardly from peripheral border 400A of main structural body 400, along fourth lateral side 403
440A protrusions formed within second lateral groove 440
451 recess accommodating first toggle latch component 51
452 recess accommodating second toggle latch component 52
453 recess accommodating third toggle latch component 53
454 recess accommodating third toggle latch component 54
461 reinforcing element (longitudinal rod) extending within main structural body 400
462 reinforcing elements (longitudinal rods) extending within main structural body 400 and second lateral flange 420
10* (unit-size) pallet module (third assortment of pallet modules)
100* main structural body of pallet module 10*
100A* generally quadrilateral peripheral border of main structural body 100*
100B* upper side of main structural body 100*
100C* lower side of main structural body 100*
101* first lateral side of main structural body 100*
102* second lateral side of main structural body 100*
103* third lateral side of main structural body 100*
104* fourth lateral side of main structural body 100*
110* first lateral flange extending outwardly from peripheral border 100A* of main structural body 100*, along first lateral side 101*
110A* positioning notch formed along an outer edge of first lateral flange 110*
120* second lateral flange extending outwardly from peripheral border 100A* of main structural body 100*, along second lateral side 102*
120A* positioning notch formed along an outer edge of second lateral flange 120*
130* first lateral groove extending inwardly from peripheral border 100A* of main structural body 100*, along third lateral side 103*
130A* protrusion formed within first lateral groove 130*
140* second lateral groove extending inwardly from peripheral border 100A* of main structural body 100*, along fourth lateral side 104* protrusion formed within second lateral groove **140\* 140A\***
151\* recess accommodating first toggle latch component 51
152\* recess accommodating second toggle latch component 52
153\* recess accommodating third toggle latch component 53
154\* recess accommodating third toggle latch component 54
161\* reinforcing elements (longitudinal rods) extending within main structural body 100\* and first lateral flange 110\*
162\* reinforcing elements (longitudinal rods) extending within main structural body 100\*
20\* (medium-size) pallet module (third assortment of pallet modules)
200\* main structural body of pallet module 20\*
200A\* generally quadrilateral peripheral border of main structural body 200\*
200B\* upper side of main structural body 200\*
200C\* lower side of main structural body 200\*
201\* first lateral side of main structural body 200\*
202\* second lateral side of main structural body 200\*
203\* third lateral side of main structural body 200\*
204\* fourth lateral side of main structural body 200\*
210\* first lateral flange extending outwardly from peripheral border 200A\* of main structural body 200\*, along first lateral side 201\*
210A\* positioning notch formed along an outer edge of first lateral flange 210\*
220\* second lateral flange extending outwardly from peripheral border 200A\* of main structural body 200\*, along second lateral side 202\*
220A\* positioning notch formed along an outer edge of second lateral flange 220\*
230\* first lateral groove extending inwardly from peripheral border 200A\* of main structural body 200\*, along third lateral side 203\*
230A\* protrusion formed within first lateral groove 230\*
240\* second lateral groove extending inwardly from peripheral border 200A\* of main structural body 200\*, along fourth lateral side 204\* protrusion formed within second lateral groove **240\* 240A\***
251\* recess accommodating first toggle latch component 51
252\* recess accommodating second toggle latch component 52 recess accommodating third toggle latch component 53
254\* recess accommodating third toggle latch component 54
261\* reinforcing elements (longitudinal rods) extending within main structural body 200\* and first lateral flange 210\*
262\* reinforcing elements (longitudinal rods) extending within main structural body 200\*
30\* (large-size) pallet module (third assortment of pallet modules)
300\* main structural body of pallet module 30\*
300A\* generally quadrilateral peripheral border of main structural body 300\*
300B\* upper side of main structural body 300\*
300C\* lower side of main structural body **300\* 300C\***
301\* first lateral side of main structural body 300\*
302\* second lateral side of main structural body 300\*
303\* third lateral side of main structural body 300\*
304\* fourth lateral side of main structural body 300\*
310\* first lateral flange extending outwardly from peripheral border 300A\* of main structural body 300\*, along first lateral side 301\*
310A\* positioning notch formed along an outer edge of first lateral flange 310\*
320\* second lateral flange extending outwardly from peripheral border 300A\* of main structural body 300\*, along second lateral side 302\*
320A\* positioning notch formed along an outer edge of second lateral flange 320\*
330\* first lateral groove extending inwardly from peripheral border 300A\* of main structural body 300\*, along third lateral side 303\*
330A\* protrusion formed within first lateral groove 330\*
340\* second lateral groove extending inwardly from peripheral border 300A\* of main structural body 300\*, along fourth lateral side 304\*
340A\* protrusion formed within second lateral groove **340\* 340A\***
351\* recess accommodating first toggle latch component 51
352\* recess accommodating second toggle latch component 52
353\* recess accommodating third toggle latch component 53
354\* recess accommodating third toggle latch component 54
361\* reinforcing elements (longitudinal rods) extending within main structural body 300\* and first lateral flange 310\*
362\* reinforcing elements (longitudinal rods) extending within main structural body 300\*
51 first toggle latch component(s) arranged in the vicinity of the first lateral side **101, 201, 301, 401, 101\*, 201\* resp. 301\***/spring-loaded latch element(s)
52 second toggle latch component(s) arranged in the vicinity of the second lateral side **102, 202, 302, 402, 102\*, 202\* resp. 302\***/spring-loaded latch element(s)
53 third toggle latch component(s) arranged in the vicinity of the third lateral side **103, 203, 303, 403, 103\*, 203\* resp. 303\***/catch element(s)
54 fourth toggle latch component(s) arranged in the vicinity of the fourth lateral side **104, 204, 304, 404, 104\*, 204\* resp. 304\***/catch element(s)
170 cover element configured to cover upper side of first lateral flange
170A extension of cover element 170 configured to fill the gap of the 170A positioning notch on the first lateral flange
171 recess formed in cover element 170 to accommodate toggle latch 171 component 71
180 cover element configured to cover upper side of second lateral flange
180A extension of cover element 180 configured to fill the gap of the positioning notch on the second lateral flange
181 recess formed in cover element 180 to accommodate toggle latch component 81
170' cover element configured to cover upper side of first lateral flange
180' cover element configured to cover upper side of second lateral flange
170\* cover element configured to cover upper side of first lateral flange
180\* cover element configured to cover upper side of second lateral flange
71 toggle latch component/catch element(s) provided on cover element 170, 170', resp. 170\*

81 toggle latch component/catch element(s) provided on cover element 180, 180', resp. 180*
500 releasable toggle latch
510 moveable latch section of spring-loaded latch element 51, resp. 52
520 handle section mechanically linked to moveable latch section 510
550 catch section of catch element 53, 54, 71, resp. 81
90 foot structure (releasable)
91 releasable foot elements
91A head portion of releasable foot element 91 dimensioned and configured to be received in mounting aperture 92A of foot-receiving element 92 or in lower mounting aperture 91C of another releasable foot element 91
91B retaining section 91B of head portion 91A configured to cooperate with spring-loaded retaining elements 95 or 95*
91C lower mounting aperture provided in lower portion of releasable foot element 91/dimensioned to receive head portion 91A of another releasable foot element 91
92 foot-receiving elements provided on lower side 100C, 200C, resp. 300C of main structural body 100, 200, resp. 300
92A mounting aperture provided in foot-receiving element 92/dimensioned to receive head portion 91A of releasable foot element 91
92B head portion of foot-receiving element 92 for attachment to lower side 100C, 200C, resp. 300C of main structural body 100, 200, resp. 300
95 spring-loaded retaining elements provided on foot-receiving element 92 and emerging inside mounting aperture 92A
95* spring-loaded retaining elements provided on lower portion of releasable foot element 91 and emerging inside lower mounting aperture 91C
90* foot structure (fixed) of pallet modules 40, 10*, 20* resp. 30*
91* fixed foot element(s) 91*
190 through-holes extending from an upper surface to a lower surface of main structural body 100, 200, 300, 400, 100*, 200* resp. 300* and first and second lateral flanges 110, 120, 210, 220, 310, 320, 410, 420, 110*, 120*, 210*, 220*, 310* resp. 320*
1000 pallet assembly built of multiple pallet modules 10 nested within and interlocked with one another
1000* pallet assembly built of multiple pallet modules 20, 30 nested within and interlocked with one another
L1 length (and width) of unit-size pallet module 10, 40, resp. 10* ("unit length")
L2 length (and width) of pallet module 20
L3 length of pallet module 30
W3 width of pallet module 30

The invention claimed is:

1. A pallet module configured to allow formation of a nested pallet assembly of at least two similar pallet modules, which nested pallet assembly is configured to act as a self-supporting platform allowing the handling and transportation of goods, the pallet module comprising:
a main structural body exhibiting a generally quadrilateral peripheral border with first to fourth lateral sides extending between upper and lower sides of the main structural body;
first and second lateral flanges extending outwardly from the peripheral border of the main structural body, along the first and second lateral sides, the first and second lateral flanges being configured to cooperate with a corresponding side portion of another similar pallet module to form the nested pallet assembly; and
a foot structure disposed on the lower side of the main structural body, wherein the main structural body exhibits first and second lateral grooves extending inwardly from the peripheral border of the main structural body, along the third and fourth lateral sides, the first and second lateral grooves being each configured to receive the first and second lateral flanges, respectively, of another similar pallet module, so that the first, respectively second lateral flange of said other similar pallet module nests within the first, respectively second lateral groove to form the nested pallet assembly, and wherein the pallet module further comprises:
first and second toggle latch components arranged in the vicinity of the first and second lateral sides, respectively; and
third and fourth toggle latch components arranged in the vicinity of the third and fourth lateral sides, respectively,
the first and second toggle latch components being each configured to cooperate and interlock with the third and fourth toggle latch components, respectively, of another similar pallet module of the nested pallet assembly, to form releasable toggle latches allowing the pallet module to be secured to or released from said other similar pallet module.

2. The pallet module according to claim 1, wherein each of the first and second lateral flanges exhibits at least one positioning notch formed along an outer edge of the first and second lateral flanges,
and wherein each of the first and second lateral grooves exhibits at least one protrusion configured to mate with the at least one positioning notch provided on the first and second lateral flanges of another similar pallet module.

3. The pallet module according to claim 2, wherein a position of each positioning notch along the outer edge of the first and second lateral flanges and a position of each protrusion within the first and second lateral grooves coincide with a position of each of the first to fourth toggle latch components along the first to fourth lateral sides.

4. The pallet module according to claim 1, wherein the first and second lateral flanges are offset sideways with respect to the first and second lateral sides.

5. The pallet module according to claim 4, wherein the first and second lateral flanges are joined together to form an L-shaped lateral flange.

6. The pallet module according to claim 1, wherein the first to fourth toggle latch components are provided on the upper side of the main structural body at least partly within recesses formed below an upper surface of the upper side of the main structural body.

7. The pallet module according to claim 1, wherein the first and second toggle latch components are spring-loaded latch elements comprising a moveable latch section that extends outwardly beyond the peripheral border of the main structural body, and wherein the third and fourth toggle latch components are catch elements comprising a catch section configured to cooperate with the moveable latch section of the spring-loaded latch elements of another similar pallet module.

8. The pallet module according to claim 7, wherein the first and second toggle latch components are manually-actuatable spring-loaded latch elements further comprising a handle section that is mechanically linked to the moveable latch section to allow manual actuation of the first and second toggle latch components.

9. The pallet module according to claim 1, wherein the first and second lateral flanges are formed integrally with the main structural body.

10. The pallet module according to claim 9, wherein the main structural body and the first and second lateral flanges are made of plastic or biopolymer material.

11. The assortment of pallet modules according to claim 10, wherein the main structural body and the first and second lateral flanges are made of high-density polyethylene (HDPE).

12. The assortment of pallet modules according to claim 10, wherein the main structural body and the first and second lateral flanges are made of a biopolymer material.

13. The pallet module according to claim 9, further comprising a plurality of reinforcing elements extending within the main structural body and the first and/or second lateral flanges.

14. The pallet module according to claim 13, wherein the reinforcing elements are made of a metal, of a metal alloy, or of a composite material.

15. The pallet module according to claim 14, wherein the reinforcing elements are made of aluminium.

16. The pallet module according to claim 13, wherein the reinforcing elements are longitudinal rod elements extending between upper and lower surfaces of the main structural body and of the first and/or second lateral flanges.

17. The pallet module according to claim 16, wherein the plurality of reinforcing elements includes a first series of longitudinal rod elements extending in a first direction and second series of longitudinal rod elements extending in a second direction distinct from the first direction.

18. The pallet module according to claim 1, further comprising at least one cover element configured to cover an upper side of the first lateral flange and/or second lateral flange, each cover element having an upper surface that is flush with an upper surface of the upper side of the main structural body,
    and wherein said at least one cover element comprises at least one toggle latch component configured to cooperate and interlock with a corresponding one of the first and second latch components to form a releasable toggle latch allowing the cover element to be secured to or released from the pallet module.

19. The pallet module according to claim 1, wherein through-holes are provided in said main structural body and said first and second lateral flanges next to the toggle latch components, which through-holes extend from an upper surface to a lower surface of the main structural body and said first and second lateral flanges.

20. The pallet module according to claim 1, wherein the foot structure is configured as a releasable foot structure comprising one or more releasable foot elements that can each be secured to or removed from a corresponding foot-receiving element provided on the lower side of the main structural body.

21. The pallet module according to claim 20, wherein each releasable foot element is connected to the foot-receiving element by means of a spring-loaded locking mechanism configured to allow the releasable foot element to be manually inserted into and automatically interlock with the foot-receiving element without this requiring any tool, the spring-loaded locking mechanism being further configured to allow selective manual release of the releasable foot element from the foot-receiving element.

22. The pallet module according to claim 1, further comprising a smart tag providing identification and traceability of the pallet module.

23. An assortment of pallet modules in accordance with claim 1 produced in at least two different sizes, wherein said assortment of pallet modules includes a unit-size pallet module whose main structural body exhibits a unit size and at least one larger-size pallet module whose main structural body exhibits a length corresponding to an integer multiple of a length of the main structural body of the unit-size pallet module, the unit-size pallet module and the at least one larger-size pallet module being combinable with one another.

24. The assortment of pallet modules according to claim 23, wherein the peripheral border of the main structural body of the unit-size pallet module exhibits a square shape.

25. The assortment of pallet modules according to claim 24, wherein the peripheral border of the main structural body of each larger-size pallet module exhibits a square shape.

26. The assortment of pallet modules according to claim 23, including at least two types of larger-size pallet modules, namely a medium-size pallet module and a large-size pallet module.

27. The assortment of pallet modules according to claim 23, wherein the length of the main structural body of the unit-size pallet module is comprised within a range of 150 to 300 mm.

28. The assortment of pallet modules according to claim 23, wherein the length of the main structural body of each pallet module is comprised within a range of 150 to 1,200 mm.

29. A pallet assembly configured to act as a self-supporting platform allowing the handling and transportation of goods, which pallet assembly is built of multiple pallet modules according to claim 1, which pallet modules are nested within and interlocked with one another.

30. Use of the pallet module according to claim 1 or of an assortment of pallet modules or a pallet assembly comprising the same for freight logistics, warehousing, transport and/or shipment purposes.

31. Use of the pallet module according to claim 1 or of an assortment of pallet modules or a pallet assembly comprising the same for intralogistics purposes.

* * * * *